United States Patent
Ang et al.

(10) Patent No.: US 11,799,615 B2
(45) Date of Patent: *Oct. 24, 2023

(54) MINIMUM SCHEDULING OFFSET

(71) Applicant: QUALCOMM Incorporated, San Diego, CA (US)

(72) Inventors: Peter Pui Lok Ang, San Diego, CA (US); Peter Gaal, San Diego, CA (US); Huilin Xu, Temecula, CA (US); Wooseok Nam, San Diego, CA (US); Muhammad Sayed Khairy Abdelghaffar, San Jose, CA (US); Aamod Dinkar Khandekar, San Diego, CA (US); Yuanning Yu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,549

(22) Filed: Jul. 19, 2022

(65) Prior Publication Data
US 2022/0360417 A1 Nov. 10, 2022

Related U.S. Application Data

(63) Continuation of application No. 16/992,920, filed on Aug. 13, 2020, now Pat. No. 11,431,463.
(Continued)

(51) Int. Cl.
*H04L 5/00* (2006.01)
*H04W 72/0446* (2023.01)
(Continued)

(52) U.S. Cl.
CPC ....... *H04L 5/0091* (2013.01); *H04W 72/0446* (2013.01); *H04W 72/23* (2023.01);
(Continued)

(58) Field of Classification Search
CPC ................ H04L 5/0091; H04W 72/23; H04W 72/231; H04W 72/232; H04W 72/0446
See application file for complete search history.

(56) References Cited

U.S. PATENT DOCUMENTS 11,431,463 B2 * 8/2022 Ang ..................... H04W 72/23
2020/0029315 A1 1/2020 Lin et al.
(Continued)

OTHER PUBLICATIONS

Apple Inc: "Cross Slot Scheduling for UE Power Saving," 3GPP Draft, 3GPP TSG RAN WG1 #97, R1-1907346 Cross Slot Scheduling Techniques for UE Power Saving.V1, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728785, 10 pages, Retrieved from the Internet: URL: http://www.3gpp.org/ftp/Meetings%5F3GPP% 5FSYNC/RAN1/Docs/R1%2D1907346%2Ezip [retrieved on May 13, 2019], paragraph [0001]-paragraph [0002].
(Continued)

*Primary Examiner* — Kevin C. Harper
(74) *Attorney, Agent, or Firm* — Patterson & Sheridan LLP

(57) ABSTRACT

Certain aspects of the present disclosure provide techniques for wireless communication scheduling. An example method that may be performed by a user equipment (UE) includes receiving, from a base station, one or more configurations indicating wireless communication resources including at least one of a plurality of bandwidth parts (BWP) or a plurality of component carriers (CCs); receiving, from the base station, control signaling indicating a scheduling offset to communicate with the base station via at last one of the BWPs within at least one of the CCs; determining a value of the scheduling offset based at least in part on a minimum (Continued)

scheduling offset value; and taking at least one action in response to the determination.

28 Claims, 12 Drawing Sheets

Related U.S. Application Data

(60) Provisional application No. 62/888,269, filed on Aug. 16, 2019.

(51) Int. Cl.
*H04W 72/23* (2023.01)
*H04L 1/1607* (2023.01)

(52) U.S. Cl.
CPC ............ *H04L 1/1642* (2013.01); *H04L 5/001* (2013.01); *H04L 5/0092* (2013.01)

(56) References Cited

U.S. PATENT DOCUMENTS

| | | |
|---|---|---|
| 2021/0050985 A1 | 2/2021 | Ang et al. |
| 2021/0136808 A1 | 5/2021 | Yang et al. |
| 2021/0400580 A1 | 12/2021 | Maleki et al. |

OTHER PUBLICATIONS

International Search Report and Written Opinion—PCT/US2020/046357—ISA/EPO—dated Oct. 12, 2020.

Mediatek Inc: "Summary of Cross-Slot Scheduling Power-Saving Techniques," 3GPP Draft, 3GPP TSG RAN WG1 Meeting #97, R1-1907918_Summary#3 of Offline on Cross-Slot Scheduling, 3rd Generation Partnership Project (3GPP), Mobile Competence Centre, 650, Route Des Lucioles, F-06921, Sophia-Antipolis Cedex, France, vol. RAN WG1, No. Reno, NV, USA, may 13, 2019-May 17, 2019, May 20, 2019 (May 20, 2019), XP051740176, 26 pages, Retrieved from the Internet: URL: http://www.3gpp.org/ftp/tsg%5Fran/WG1%5FRL1/TSGR1%5F97/Docs/R1%2D1907918%2Ezip [retrieved on May 20, 2019] paragraph [0002]-paragraph [0005].

Qualcomm Incorporated: "Cross-Slot Scheduling Power Saving Techniques", 3GPP Draft, 3GPP TSG-RAN WG1 #97, R1-1907295 Cross-Slot Scheduling Power Saving Techniques, 3rd Generation Partnership Project (3GPP), Mobile Competence Centre, 650, Route Des Lucioles, F-06921 Sophia-Antipolis Cedex, France, vol. RAN WG1, No. Reno, USA, may 13, 2019-May 17, 2019, May 13, 2019 (May 13, 2019), XP051728735, 16 pages, Retrieved from the Internet: URL: http://www.3gpp.org/ftp/Meetings%5F3GPP%5FSYNC/RAN1/Docs/R1%2D1907295%2Ezip [retrieved on May 13, 2019], p. 1 p. 3 p. 6 p. 11, paragraph [0001]-paragraph [0002].

Qualcomm Incorporated: "Maintenance for Carrier Aggregation and Bandwidth Parts", 3GPP Draft, 3GPP TSG RAN WG1 Meeting #94, R1-1809429, Maintenance for CA BWP, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 20, 2018-Aug. 24, 2018, Aug. 24, 2018 (Aug. 24, 2018), XP051516792, 18 Pages, Retrieved from the Internet: URL: http://www.3gpp.org/ftp/tsg%5Fran/WG1%5FRL1/TSGR1%5F94/Docs/R1%2D1809429%2Ezip [retrieved on Aug. 11, 2018] p. 11, Sects 2.1.4, 3.2, lines 27-30 p. 15, lines 9-20, Sections 1-4, paragraph [0002].

* cited by examiner

| μ | NR Slot length (ms) | BWP switch delay $T_{BWPswitchDelay}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |
| Note 1: Depends on UE capability. | | | |
| Note 2: If the BWP switch involves changing of SCS, the BWP switch delay is determined by the larger one between the SCS before BWP switch and the SCS after BWP switch. | | | |

FIG. 7

MINIMUM SCHEDULING OFFSET

CROSS-REFERENCE TO RELATED APPLICATIONS

The present Application for Patent is a continuation of U.S. Non-Provisional application Ser. No. 16/992,920, filed Aug. 13, 2020, which claims benefit of U.S. Provisional Application No. 62/888,269, filed Aug. 16, 2019, each of which is assigned to the assignee of the present application and hereby expressly incorporated by reference herein in its entirety.

BACKGROUND

Field of the Disclosure

Aspects of the present disclosure relate to wireless communications, and more particularly, to a minimum scheduling offset relative to downlink control signaling.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable wireless communication scheduling.

Certain aspects provide a method for wireless communication by a user equipment. The method generally includes receiving, from a base station, one or more configurations indicating wireless communication resources including at least one of a plurality of bandwidth parts (BWP) or a plurality of component carriers (CCs); receiving, from the base station, control signaling indicating a scheduling offset to communicate with the base station via at last one of the BWPs within at least one of the CCs, wherein the control signaling indicates to communicate with the base station via a target BWP that is different from an active BWP; converting a minimum scheduling offset value associated with the active BWP to a numerology of the target BWP; determining a value of the scheduling offset based at least in part on the converted minimum scheduling offset value; and performing at least one action in response to the determination.

Certain aspects provide a method for wireless communication by a user equipment. The method generally includes receiving one or more configurations indicating wireless communication resources including at least one of a plurality of bandwidth parts (BWP) or a plurality of component carriers (CCs); receiving control signaling indicating a scheduling offset to communicate with a base station via at last one of the BWPs within at least one of the CCs, wherein the control signaling indicates to communicate with the base station via a target BWP that is different from an active BWP; converting a minimum scheduling offset value associated with the active BWP to a numerology of the target BWP; and communicating with the base station via the target BWP in response to determining that a value of the scheduling offset is greater than or equal to the converted minimum scheduling offset value.

Certain aspects provide an apparatus for wireless communication. The apparatus generally includes a memory, and a processor coupled to the memory. The processor and the memory are configured to: receive, from a base station, one or more configurations indicating wireless communication resources including at least one of a plurality of bandwidth parts (BWP) or a plurality of component carriers (CCs), receive, from the base station, control signaling indicating a scheduling offset to communicate with the base station via at last one of the BWPs within at least one of the CCs, wherein the control signaling indicates to communicate with the base station via a target BWP that is different from an active BWP, convert a minimum scheduling offset value associated with the active BWP to a numerology of the target BWP, determine that a value of the scheduling offset based at least in part on the converted minimum scheduling offset value, and perform at least one action in response to the determination.

Certain aspects provide an apparatus for wireless communication. The apparatus generally includes a memory and a processor coupled to the memory. The processor and the memory are configured to: receive one or more configurations indicating wireless communication resources including at least one of a plurality of bandwidth parts (BWP) or a plurality of component carriers (CCs), receive control signaling indicating a scheduling offset to communicate with a base station via at last one of the BWPs within at least one of the CCs, wherein the control signaling indicates to communicate with the base station via a target BWP that is different from an active BWP, convert a minimum scheduling offset value associated with the active BWP to a numerology of the target BWP, and communicate with the base station via the target BWP in response to determining that a value of the scheduling offset is greater than or equal to the converted minimum scheduling offset value.

Certain aspects provide an apparatus for wireless communication. The apparatus generally includes means for receiving, from a base station, one or more configurations indicating wireless communication resources including at least one of a plurality of bandwidth parts (BWP) or a plurality of component carriers (CCs); means for receiving, from the base station, control signaling indicating a scheduling offset to communicate with the base station via at last one of the BWPs within at least one of the CCs, wherein the control signaling indicates to communicate with the base station via a target BWP that is different from an active BWP; means for converting a minimum scheduling offset value associated with the active BWP to a numerology of the target BWP; means for determining a value of the scheduling offset based at least in part on the converted minimum scheduling offset value; and means for performing at least one action in response to the determination.

Certain aspects provide an apparatus for wireless communication. The apparatus generally includes means for receiving one or more configurations indicating wireless communication resources including at least one of a plurality of bandwidth parts (BWP) or a plurality of component carriers (CCs); means for receiving control signaling indicating a scheduling offset to communicate with a base station via at last one of the BWPs within at least one of the CCs, wherein the control signaling indicates to communicate with the base station via a target BWP that is different from an active BWP; means for converting a minimum scheduling offset value associated with the active BWP to a numerology of the target BWP; and means for communicating with the base station via the target BWP in response to determining that a value of the scheduling offset is greater than or equal to the converted minimum scheduling offset value.

Certain aspects provide a computer readable medium having instructions stored thereon for receiving, from a base station, one or more configurations indicating wireless communication resources including at least one of a plurality of bandwidth parts (BWP) or a plurality of component carriers (CCs); receiving, from the base station, control signaling indicating a scheduling offset to communicate with the base station via at last one of the BWPs within at least one of the CCs, wherein the control signaling indicates to communicate with the base station via a target BWP that is different from an active BWP; converting a minimum scheduling offset value associated with the active BWP to a numerology of the target BWP; determining a value of the scheduling offset based at least in part on the converted minimum scheduling offset value; and performing at least one action in response to the determination.

Certain aspects provide a computer readable medium having instructions stored thereon for receiving one or more configurations indicating wireless communication resources including at least one of a plurality of bandwidth parts (BWP) or a plurality of component carriers (CCs); receiving control signaling indicating a scheduling offset to communicate with a base station via at last one of the BWPs within at least one of the CCs, wherein the control signaling indicates to communicate with the base station via a target BWP that is different from an active BWP; converting a minimum scheduling offset value associated with the active BWP to a numerology of the target BWP; and communicating with the base station via the target BWP in response to determining that a value of the scheduling offset is greater than or equal to the converted minimum scheduling offset value.

Certain aspects provide a method for wireless communication by a user equipment. The method generally includes receiving, from a base station, one or more configurations indicating wireless communication resources including at least one of a plurality of bandwidth parts (BWP) or a plurality of component carriers (CCs); receiving, from the base station, control signaling indicating a scheduling offset to communicate with the base station via at last one of the BWPs within at least one of the CCs; determining a value of the scheduling offset based at least in part on a minimum scheduling offset value; and taking at least one action in response to the determination.

Certain aspects provide a method for wireless communication by a base station. The method generally includes determining one or more configurations indicating wireless communication resources including at least one of a plurality of bandwidth parts (BWP) or a plurality of component carriers (CCs); transmitting the one or more configurations to a user equipment (UE); determining a minimum scheduling offset value for a scheduling offset that indicates a scheduling delay to communicate via at last one of the BWPs within at least one of the CCs; and configuring the UE with the minimum scheduling offset value.

Certain aspects provide an apparatus for wireless communication. The apparatus generally includes a receiver configured to receive, from a base station, one or more configurations indicating wireless communication resources including at least one of a plurality of bandwidth parts (BWP) or a plurality of component carriers (CCs), and receive, from the base station, control signaling indicating a scheduling offset to communicate with the base station via at last one of the BWPs within at least one of the CCs. The apparatus also includes a processor coupled to a memory, where the processor and the memory are configured to determine a value of the scheduling offset based at least in part on a minimum scheduling offset value, and take at least one action in response to the determination. The apparatus further includes a memory coupled to the processor.

Certain aspects provide an apparatus for wireless communication. The apparatus generally includes a processor coupled to a memory, where the processor and the memory are configured to determine one or more configurations indicating wireless communication resources including at least one of a plurality of bandwidth parts (BWP) or a plurality of component carriers (CCs), and determine a minimum scheduling offset value for a scheduling offset that indicates a scheduling delay to communicate via at last one of the BWPs within at least one of the CCs. The apparatus also includes a transmitter configured to transmit the one or more configurations and the minimum scheduling offset value to a user equipment (UE). The apparatus further includes a memory coupled to the processor.

Certain aspects provide an apparatus for wireless communication. The apparatus generally includes means for receiving, from a base station, one or more configurations indicating wireless communication resources including at least one of a plurality of bandwidth parts (BWP) or a plurality of component carriers (CCs); means for receiving, from the base station, control signaling indicating a scheduling offset to communicate with the base station via at last one of the BWPs within at least one of the CCs; means for determining a value of the scheduling offset based at least in part on a minimum scheduling offset value; and means for taking at least one action in response to the determination.

Certain aspects provide an apparatus for wireless communication. The apparatus generally includes means for determining one or more configurations indicating wireless communication resources including at least one of a plurality of bandwidth parts (BWP) or a plurality of component carriers (CCs); means for transmitting the one or more configurations to a user equipment (UE); means for determining a minimum scheduling offset value for a scheduling offset that indicates a scheduling delay to communicate via at last one of the BWPs within at least one of the CCs; and means for configuring the UE with the minimum scheduling offset value.

Certain aspects provide a computer readable medium having instructions stored thereon for receiving, from a base station, one or more configurations indicating wireless communication resources including at least one of a plurality of bandwidth parts (BWP) or a plurality of component carriers (CCs); receiving, from the base station, control signaling indicating a scheduling offset to communicate with the base station via at last one of the BWPs within at least one of the CCs; determining a value of the scheduling offset based at least in part on a minimum scheduling offset value; and taking at least one action in response to the determination.

Certain aspects provide a computer readable medium having instructions stored thereon for determining one or more configurations indicating wireless communication resources including at least one of a plurality of bandwidth parts (BWP) or a plurality of component carriers (CCs); transmitting the one or more configurations to a user equipment (UE); determining a minimum scheduling offset value for a scheduling offset that indicates a scheduling delay to communicate via at last one of the BWPs within at least one of the CCs; and configuring the UE with the minimum scheduling offset value.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates an example table of various BWP switch delay values, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for wireless communication scheduling, including for example, a framework for determining a minimum scheduling offset on downlink triggered events under multi-carrier and/or multi-BWP configurations. Such a scheduling framework may provide desirable power consumption at a user equipment and reduce signaling overhead at a base station.

The following description provides examples of wireless communication scheduling in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
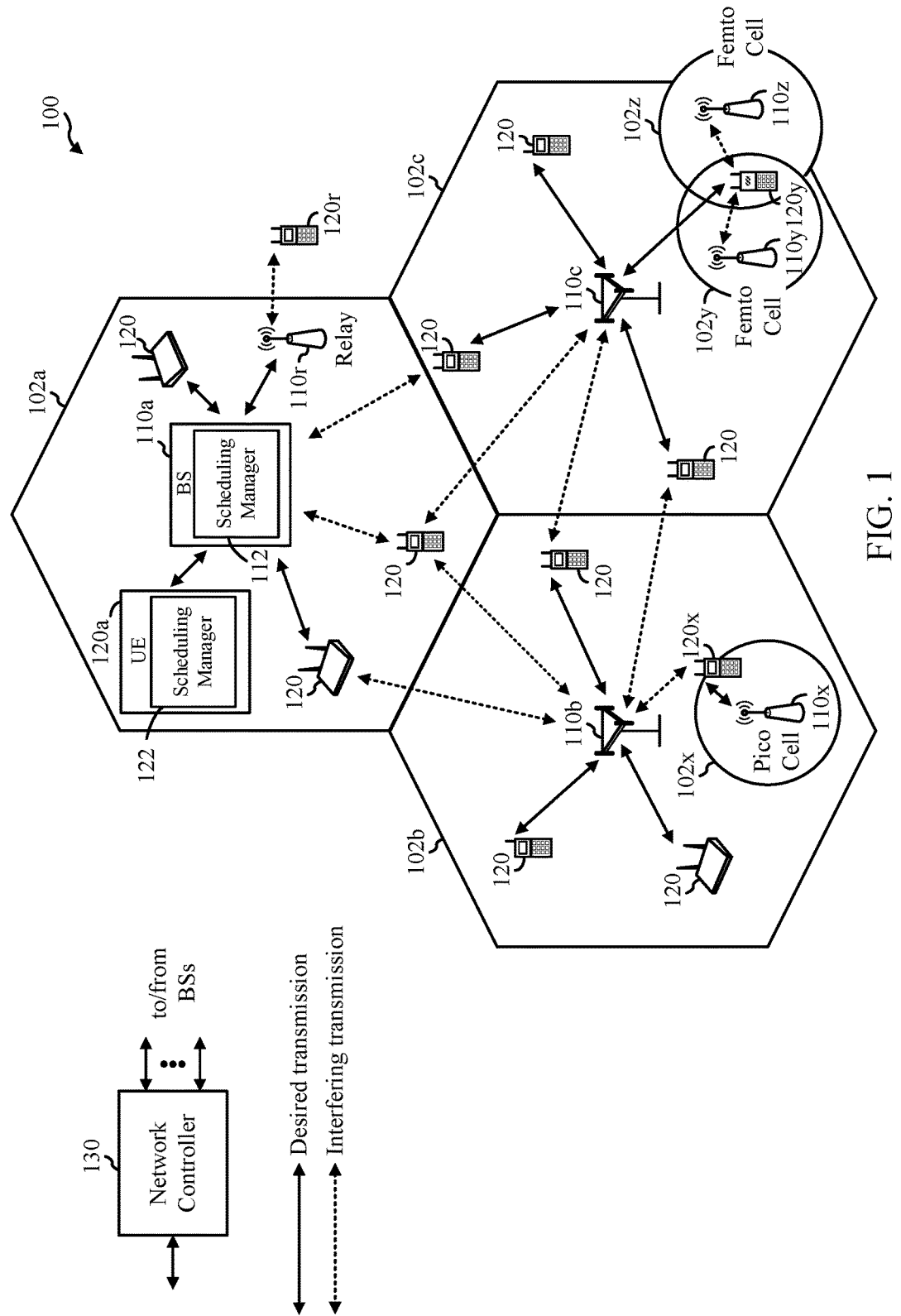
FIG. 1 is a block diagram conceptually illustrating an example telecommunications system, in accordance with certain aspects of the present disclosure.

FIG. 1 illustrates an example wireless communication network 100 in which aspects of the present disclosure may be performed. The wireless communication network 100 may be an NR system (e.g., a 5G NR network). As shown in FIG. 1, the UE 120a includes a scheduling manager 122 that determines a value of a scheduling offset (such as for DL/UL resource grants) based at least in part on a minimum scheduling offset value, in accordance with aspects of the present disclosure. The BS 110a includes a scheduling manager 112 that determines a minimum scheduling offset value for a scheduling offset that indicates a scheduling delay to communicate with a UE, in accordance with aspects of the present disclosure.

NR is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
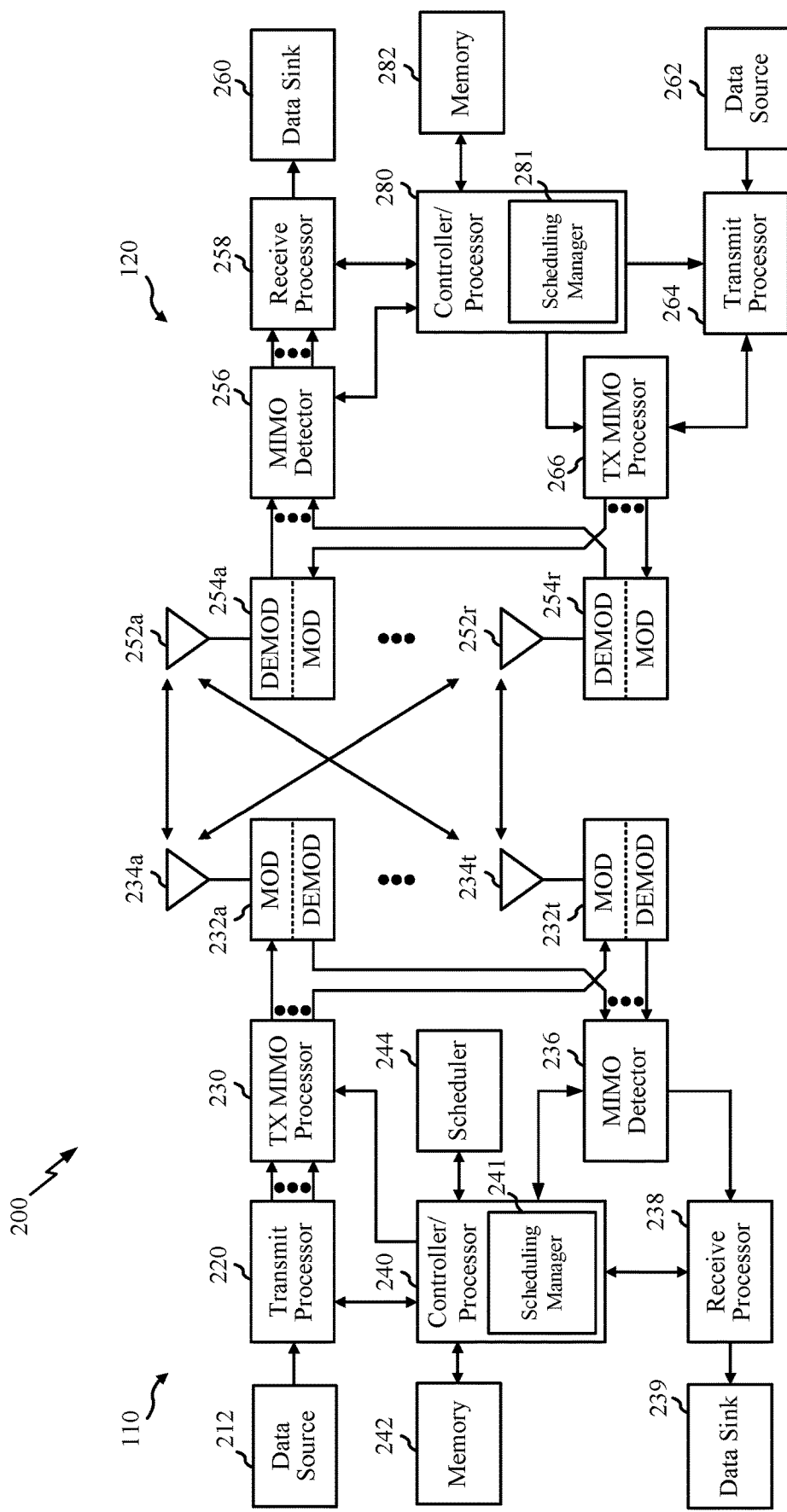
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has a scheduling manager 281 that determines a value of a scheduling offset (such as for DL/UL resource grants) based at least in part on a minimum scheduling offset value, according to aspects described herein. The controller/processor 240 of the BS 110a has a scheduling manager 241 that determines a minimum scheduling offset value for a scheduling offset that indicates a scheduling delay to communicate with a UE, according to aspects described herein. Although shown at the Controller/Processor, other components of the UE 120a and BS 110a may be used performing the operations described herein.

Figure 3:
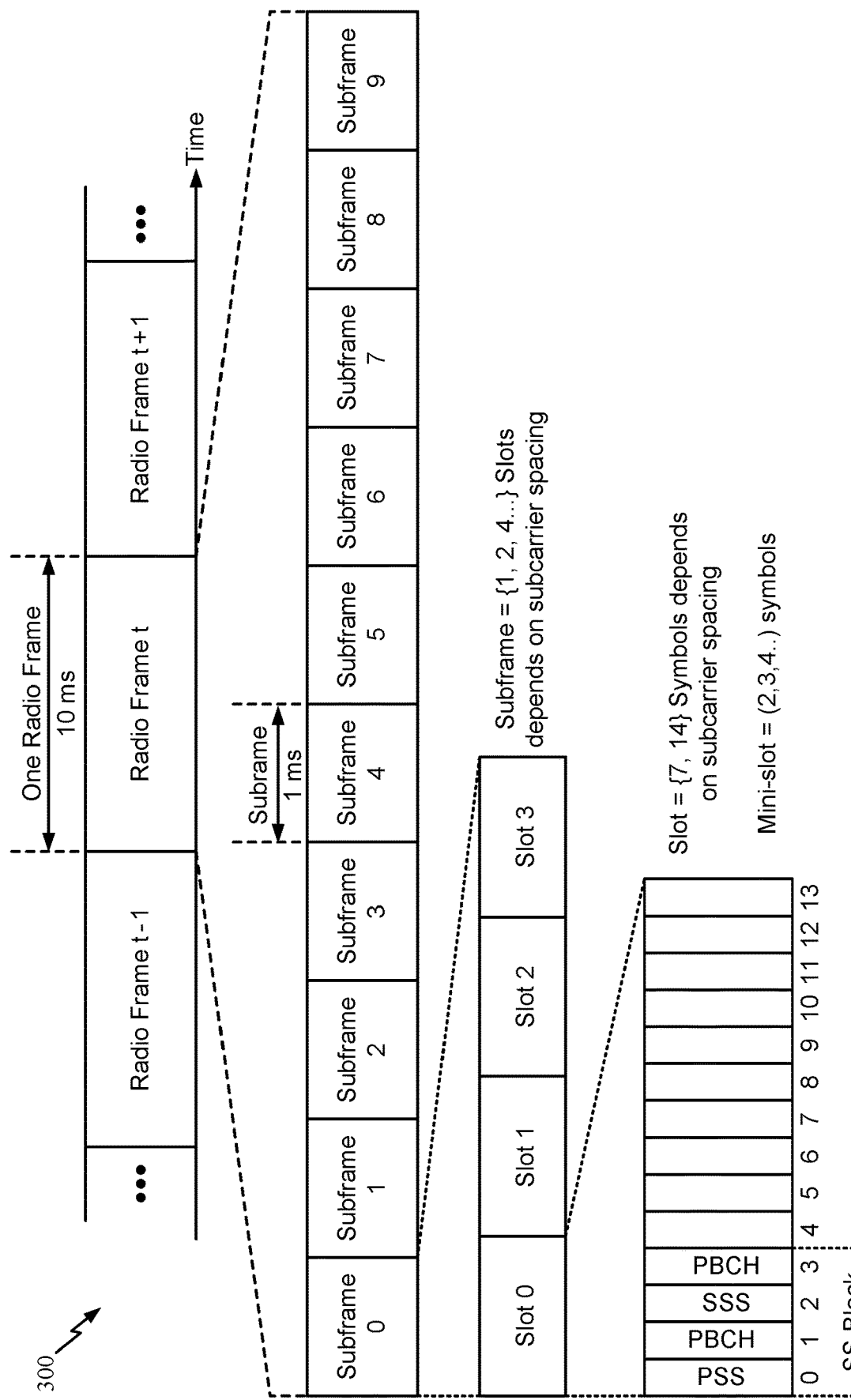
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Example Minimum Scheduling Offset

In certain wireless communication networks (e.g. 5G NR), scheduling events (such as DL/UL resource grants or aperiodic triggers) may be supported on a cross-slot basis or an intra-slot (i.e., same-slot) basis. For example, under cross-slot scheduling, a UE may receive in a slot downlink control signaling (e.g., a downlink control information (DCI) message) that schedules the UE to receive DL transmissions in another slot. Under intra-slot scheduling, the UE may receive in a slot DCI that schedules the UE to receive DL transmissions later in the same slot. Switching from intra-slot scheduling to cross-slot scheduling may enable the UE to reduce power consumption. For instance, cross-slot scheduling may facilitates a longer micro-sleep period (e.g., when radio interfaces are temporarily disabled, but signal processing is enabled), such as when PDCCH processing is out of critical timeline. A longer scheduling offset under cross-slot scheduling may enable the UE enough time to wake up from sleep and enable radio interfaces. Scheduling events via cross-slot scheduling or intra-slot scheduling may be applicable to DL/UL resource grants (e.g., PDSCH/PUSCH) and other DCI-triggered events, such as aperiodic channel state information reference signal (A-CSI-RS) monitoring and reporting.

Figure 4A:
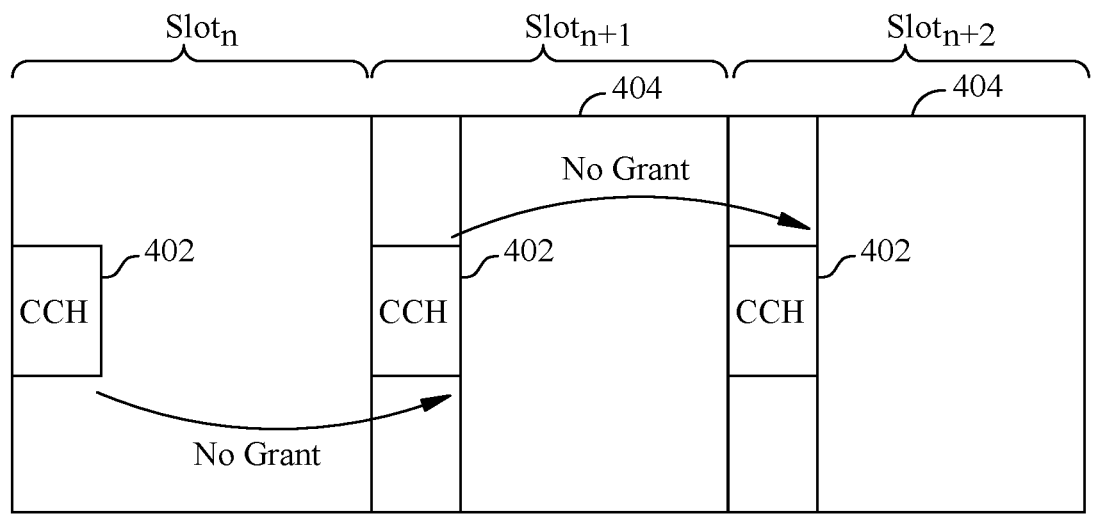
FIG. 4A illustrates example cross-slot scheduling of downlink communications, in accordance with certain aspects of the present disclosure.

FIG. 4A illustrates example cross-slot scheduling of downlink communications, in accordance with certain aspects of the present disclosure. A UE may receive DCI 402 from a BS via a control channel such as a PDCCH. The DCI 402 may be received in $slot_n$ and indicate a scheduling offset (e.g., via the parameter k0) that schedules a cross-slot DL data transmission 404 in $slot_{n+1}$. The DL scheduling offset parameter, k0, is greater than zero and provides a delay between a DL grant (DCI 402) and a corresponding DL data reception (e.g., via PDSCH). That is, the scheduling offset may be a specific duration (such as a number of time-domain resources) from a specific reference point (such as a time-domain resource at which downlink signaling (e.g., DCI 402) is received or at which uplink signaling is transmitted). In certain cases, the delay between the control signaling (DCI 402) and the data transmission 404 may enable the UE to enter a microsleep state to reduce power consumption. In the example, in a slot (e.g. $slot_{n+1}$), the UE may not wait for PDCCH processing to finish before entering a microsleep state because the UE already knows from the PDCCH received in the previous slot (e.g. $slot_n$) whether PDSCH would be transmitted by the gNB for this slot (e.g. $slot_{n+1}$).

Figure 4B:
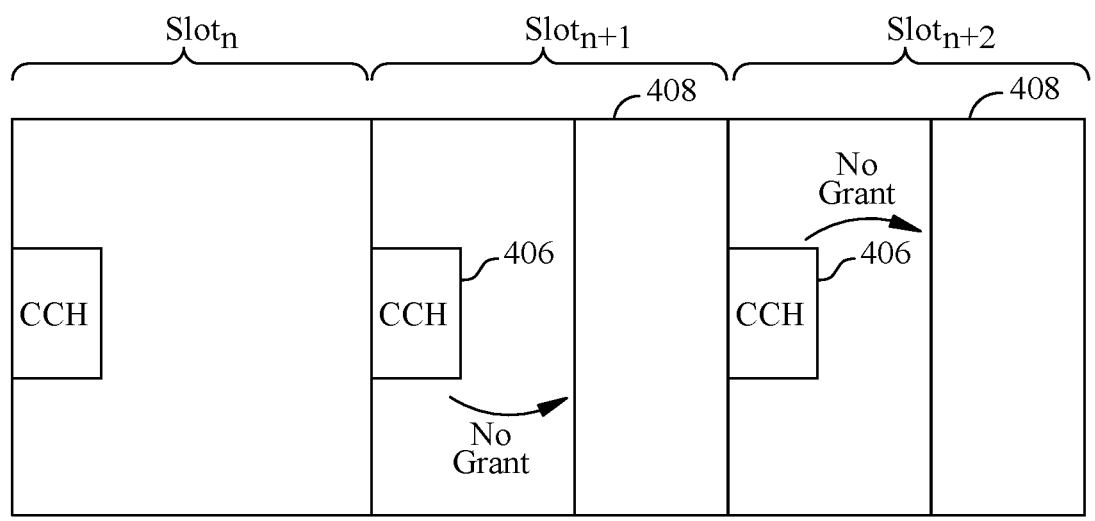
FIG. 4B illustrates example intra-slot scheduling of uplink communications, in accordance with certain aspects of the present disclosure.

FIG. 4B illustrates example intra-slot scheduling of downlink communications, in accordance with certain aspects of the present disclosure. A UE may receive DCI 406 from a BS via a control channel such as the PDCCH. The DCI 406 may be received in $slot_{n+1}$ and indicate a scheduling offset (e.g., via the parameter k0) that schedules an intra-slot UL data transmission 408 in the same $slot_{n+1}$. In this case, the DL scheduling offset parameter, k0, is zero and does not provide a delay between an DL grant (DCI 406) and a corresponding DL data transmission (e.g., via PDSCH). In order to enter a microsleep state within a slot, the UE has to wait for PDCCH processing to complete to ensure there is no PDSCH scheduled for the same slot, meanwhile still keep receiving and buffering Rx samples in case a DL scheduling DCI is decoded to indicate a PDSCH transmission by the BS in the same slot. Hence the portion of a slot that allows for microsleep is much smaller compared to the cross-slot scheduling case (e.g., FIG. 4A), which may result in less power saving. In certain cases, intra-slot scheduling may enable the UE to communicate via URLLC services because of the smaller delay between the control signaling (DCI 402) and the data transmission 404.

In certain wireless communication networks (e.g., 5G NR), bandwidth parts (BWPs) provide a flexible framework for dividing frequency-domain resources in a given carrier. With bandwidth parts, a carrier may be subdivided into different bandwidth segments. For instance, BWPs may overlap with each other or be non-contiguous (i.e., separated from each other, for example, by a guard band). The BWPs may also be used for various purposes or functions. For instance, during a period of low data activity (e.g., low throughput demands), a UE may communicate with a narrower BWP, and during a period of high data activity (e.g., high throughput demands), the UE may communicate with a wider BWP. The narrower BWP, as compared to the wider BWP, may provide a more energy efficient solution for wireless communications. That is, the UE may switch from the wider BWP to the narrower BWP to enable reduced power consumption for wireless communications. As another example, different BWPs may be used for different services or functions, such as eMBB or URLLC transmissions. In some cases, different BWPs may enable coexistence of other systems or networks.

Figure 5:
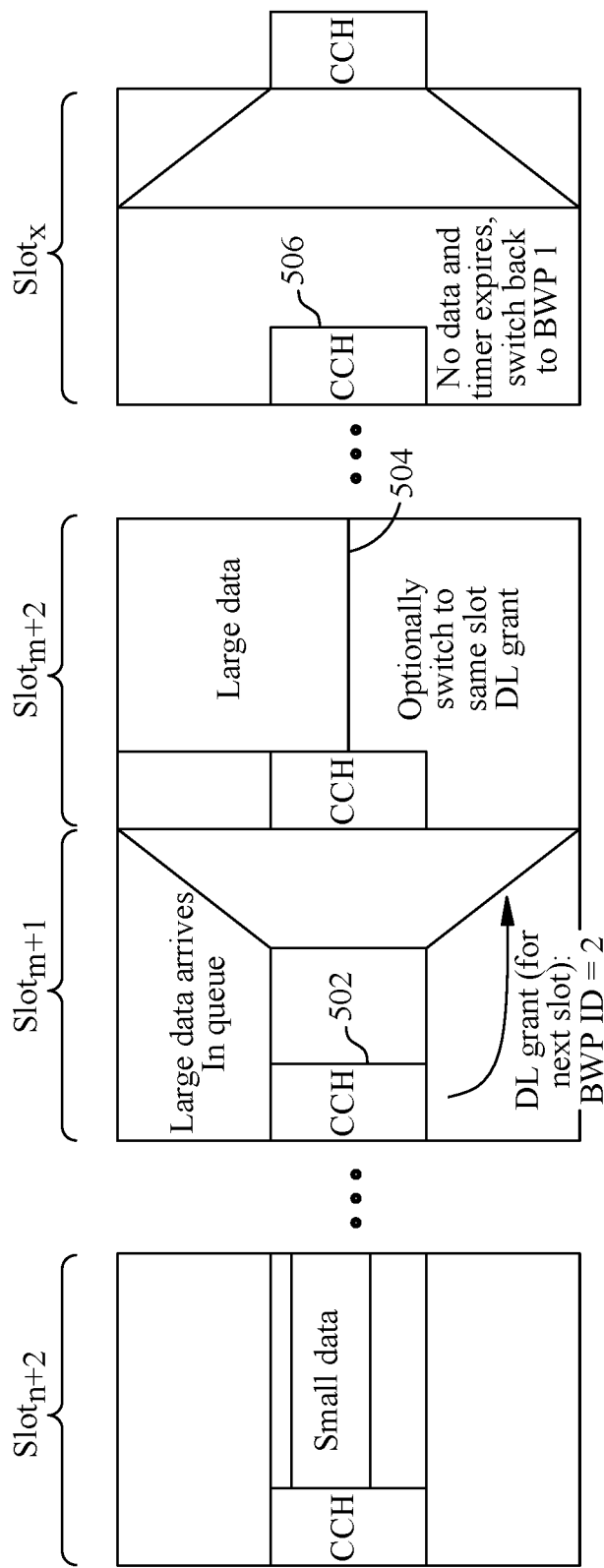
FIG. 5 illustrates example cross-bandwidth part (BWP) scheduling of downlink communications, in accordance with certain aspects of the present disclosure.

FIG. 5 illustrates example cross-BWP scheduling of downlink communications, in accordance with certain aspects of the present disclosure. A UE may receive DCI 502 from a BS via a control channel on a first BWP (e.g., a narrow BWP). The DCI 502 may be received in $slot_{m+1}$ and indicate a BWP identifier of a second BWP (e.g., a wider BWP) and a scheduling offset (e.g., via the parameter k0) that schedules a cross-slot DL data transmission 504 in a $slot_{m+2}$ of the second BWP. The BWP identifier may be a value (an integer value) used to refer to a BWP among BWPs configured on the UE. For example, suppose the UE is receiving a small amount of data in the slots preceding $slot_{m+1}$ (such as $slot_{n+2}$), and in $slot_{m+1}$ a large amount of data arrives for transmission to the UE. The UE may be configured by the BS to switch to a wider BWP such as the second BWP in $slot_{m+2}$. After a certain duration, the UE may receive, for example in $slot_x$, DCI 506 that indicates to switch to the first BWP (e.g., the narrow BWP).

In certain wireless communication networks (e.g. 5G NR), a minimum scheduling offset may be used to determine various actions related to downlink scheduled events such as DL/UL grants, cross-BWP scheduling, or cross-carrier scheduling. In certain aspects, the minimum scheduling offset may be the minimum applicable value for k0, k2, and A-CSI-RS triggering. In cases where k0/k2 is below the minimum scheduling offset, a UE may either invalidate the DCI based on an indicated k0/k2 or adjust the indicated k0/k2, according to the minimum scheduling offset. In other cases, when the UE receives an indication of the minimum scheduling offset of k0/k2, an entry in the active DL (UL) time-domain resource allocation (TDRA) table with k0 (k2) value smaller than the indicated minimum value is not expected by the UE.

One or more values of a minimum scheduling offset may be configured via downlink control signaling such as radio resource control (RRC) signaling and/or DCI. For example, the UE may be directly assigned a minimum scheduling offset value via DCI signaling. In other cases, the UE may receive an indication of a minimum scheduling offset value from one or multiple values preconfigured through RRC signaling. A L1-based adaptation of a minimum scheduling offset may additional to a BWP-switching based time-domain resource allocation adaptation. A non-zero A-CSI-RS triggering offset may be used for non-Type-D quasi-colocation (QCL) monitoring and reporting. A minimum A-CSI-RS triggering offset may be implicitly indicated based on the minimum value for k0. The L1-based adaptation of the minimum applicable value of k0 may not apply to SI/RA/TC/P-RNTI in Type 0/0A/1/2 common search space respectively. The L1-based adaptation of the minimum applicable value of k2 may not apply to PUSCH scheduled by a MAC RAR for contention-based and contention-free RACH or a PUSCH scheduled by TC-RNTI.

Under multi-carrier or multi-BWP configurations, the minimum scheduling offset value may be ambiguous based on differing numerologies associated with the carriers and/or BWPs. For instance, a UE configured with a minimum scheduling offset value may misinterpret the minimum scheduling offset value for cross-BWP scheduling when the target BWP has a different numerology than the active BWP on which the cross-BWP scheduling instruction was received. Suppose for example, the target BWP has a subcarrier spacing (SCS) of 30 kHz, the active BWP has a SCS of 15 kHz, and the minimum scheduling offset is defined in terms of slots. Under such a scenario, the slot duration of the active BWP is 1 ms, whereas the slot duration of the target BWP is 0.5 ms, which may lead to the UE attempting to apply a minimum scheduling offset at half the duration of what was intended. Thus, the misinterpreted minimum scheduling offset may result in missed transmissions and/or increased power consumption. In other cases, the minimum scheduling offset may be updated to handle the differing numerologies, but such a scheme would result in increased downlink signaling/overhead.

Aspects of the present disclosure generally relate to a framework for determining a minimum scheduling offset on downlink triggered events under multi-carrier and/or multi-BWP configurations. Such a scheduling framework may provide efficient wireless communications including desirable power consumption and reduced overhead signaling. As an example, the minimum scheduling offset may be given in terms a time-domain resource (e.g., a number of slots) according to a numerology of an active BWP, a reference numerology, or a set of values associated with various BWPs. In other cases, the minimum scheduling offset may be set according to the units of k0 or k2. As another example, the minimum scheduling offset may be set according to an absolute time value. With cross-BWP and/or cross-carrier scheduling, the minimum scheduling offset may be defined per component carrier (CC) (e.g., common across BWPs in a given CC) or per BWP as further described herein. The UE may be configured with various values of the minimum scheduling offset via downlink control signaling, including downlink control information (DCI), a medium access control (MAC) control element (CE), or radio resource control (RRC) configuration.

In case a minimum scheduling offset is defined per CC, the minimum scheduling offset may be defined in terms of a designated numerology of a BWP (e.g. 15 kHz SCS). In aspects, the minimum scheduling offset may have values associated with each of the BWP in the CC (e.g. the minimum scheduling offset parameter, X=2 slots for 15 kHz SCS, and X=4 slots for 30 kHz SCS). In other aspects, the minimum scheduling offset may be defined in terms of an absolute time value, e.g., 2 msec. When applied to k0 or k2, the minimum scheduling offset may converted to the corresponding SCS of PDSCH or PUSCH.

In some cases, a minimum scheduling offset defined per CC may not be well suited in cases where the BWPs target different data usage scenarios, such as a narrow BWP for low data usage and low power consumption. For instance, when switching to a narrower BWP, it may be desirable to also change the minimum scheduling offset that facilitates power savings (e.g., a longer minimum scheduling offset). As another example, when switching to a wider BWP, it may be desirable to have a shorter minimum scheduling offset to facilitate lower latency communications. If the minimum scheduling offset is common across a CC, it may lead to higher signaling overhead, for example, to update the minimum scheduling offset when switching the BWP. Instead, the minimum scheduling offset may be defined per BWP to account for changes in the numerology or function of a BWP.

In certain aspects, the minimum scheduling offset may be defined per BWP according to various frameworks. For instance, when a UE is instructed to switch from an active BWP to a target BWP (e.g., triggered by cross-BWP scheduling), the minimum scheduling offset may be defined according to the numerology of the active BWP. In other cases, the minimum scheduling offset may be defined according to the numerology of the target BWP. In aspects, the minimum scheduling offset may be defined according to a maximum of a minimum value associated with the active BWP and a minimum value associated with the target BWP. In other aspects, the minimum scheduling offset may be defined according to a sum of a minimum value associated with the active BWP and a minimum value associated with the target BWP. In still other aspects, the minimum scheduling offset may be defined for cross-BWP scheduling independently.

In cases where the minimum scheduling offset is defined according to the numerology of the active BWP, the minimum scheduling offset provides the same delay as scheduling within the same BWP before the BWP switch. If the current and target BWPs have different numerologies, and if minimum scheduling offset is defined in a number of slots of the current BWP's numerology, conversion of the offset to the target BWP's numerology may be applied to cross-BWP scheduling. For instance, the minimum scheduling offset conversion may be given by the following expression:

$$X' = \left\lceil X \cdot \frac{2^{\mu_{BWP,target}}}{2^{\mu_{BWP,curr}}} \right\rceil \quad (1)$$

where X' is the converted minimum scheduling offset, X is the minimum scheduling offset being converted such as the minimum offset associated with the active BWP, $\mu_{BWP,target}$ is the numerology of the target BWP, $\mu_{BWP,curr}$ is the numerology of the active BWP.

Figure 6A:
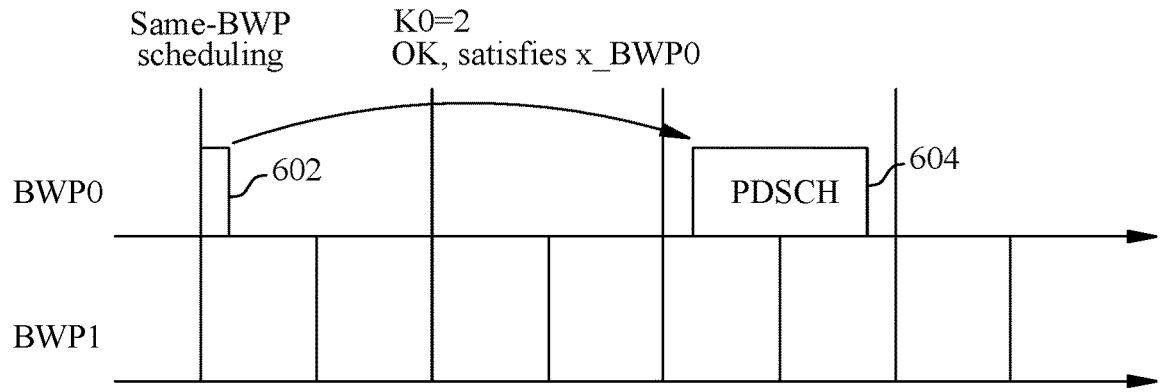
FIG. 6A illustrates example intra-BWP scheduling of downlink communications where a minimum scheduling offset is defined according to a numerology of an active BWP, in accordance with certain aspects of the present disclosure.

FIG. 6A illustrates example intra-BWP scheduling of downlink communications where the minimum scheduling offset is defined according to the numerology of the active BWP, in accordance with certain aspects. Suppose a BWP switch delay is configured as 1 slot at 15 kHz SCS and 2 slots at 30 kHz SCS, the minimum scheduling offset (X) associated with BWP0 (15 kHz SCS) is set as 2 slots, the minimum scheduling offset (X) associated with BWP1 (30 kHz SCS) is set as 0 slots, and BWP0 and BWP1 may each have various values of k0 configured. As shown, a UE may receive DCI 602 from a BS via a control channel such as a PDCCH. The DCI 602 may be received in $slot_n$ and indicate a scheduling offset (e.g., k0=2) that schedules a cross-slot DL data transmission 604 in $slot_{n+2}$. If the minimum scheduling offset associated with active BWP (BWP0) is applied, the scheduling offset of k0=2 satisfies the minimum scheduling offset value of 2 slots.

Figure 6B:
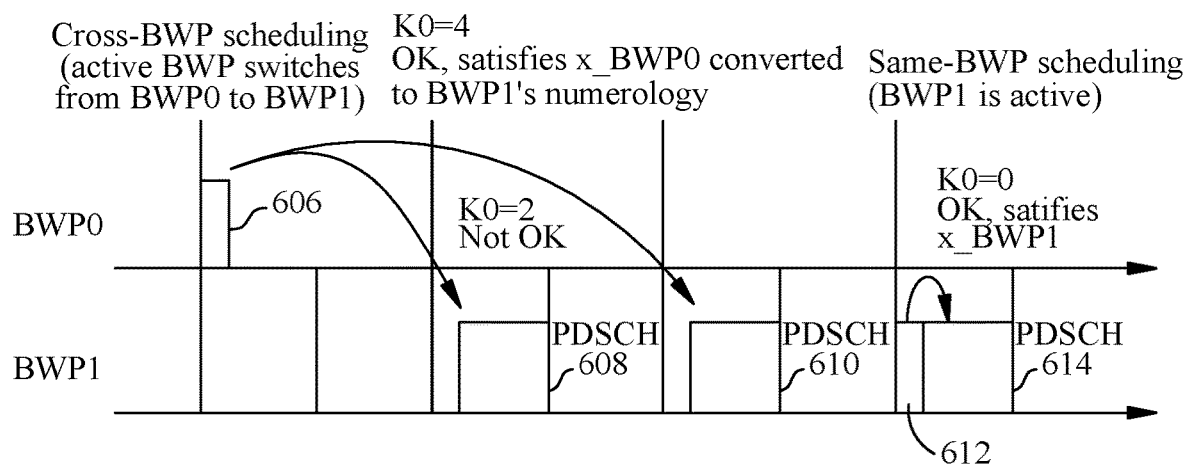
FIG. 6B illustrates example cross-BWP scheduling and intra-BWP scheduling of downlink communications where the active BWP provides the minimum scheduling offset, in accordance with certain aspects of the present disclosure.

FIG. 6B illustrates example cross-BWP scheduling and intra-BWP scheduling of downlink communications where the active BWP provides the minimum scheduling offset, in accordance with certain aspects of the present disclosure. As shown, a UE may receive DCI 606 from a BS via a control channel such as a PDCCH. The DCI 606 may be received in $slot_n$ and indicate BWP identifier of BWP1 and a scheduling offset (e.g., k0=2 in terms of BWP1) that schedules a cross-BWP DL data transmission 608 in $slot_{n+2}$ of BWP1. Assuming the same scheduling parameters (BWP switch delay, k0, and X) described herein with respect to FIG. 6A apply under this example, if the minimum scheduling offset associated with active BWP (BWP0) is converted to the numerology of the target BWP, for example, according to Equation (1), the conversion returns a minimum scheduling offset of 4 slots in terms of BWP1. In this example, k0=2 is below the converted minimum scheduling offset and not a valid DCI setting. Instead, if the DCI 606 indicates a scheduling offset (e.g., k0=4 in terms of BWP1) that schedules a cross-slot DL data transmission 610 in $slot_{n+4}$ of BWP1, the scheduling offset (k0=4) satisfies the minimum scheduling offset. In aspects, the DL/UL grant parameters (k0, k2) may be checked according to the following expression:

$$\{k0 \mid k2\} \leq \left\lceil X \cdot \frac{2^{\mu_{BWP,target}}}{2^{\mu_{BWP,curr}}} \right\rceil \quad (2)$$

If the DL/UL grant parameters (k0, k2) are less than or equal to the converted minimum scheduling offset (X'), the DL/UL grant parameters (k0, k2) may be treated as invalid parameters. In other words, the UE may not expect the DL/UL grant parameters (k0, k2) to be less than or equal to the converted minimum scheduling offset. If the DL/UL grant parameters (k0, k2) are greater than (or equal to) the converted minimum scheduling offset, the DL/UL grant parameters (k0, k2) may be treated as valid parameters.

Referring to FIG. 6B, the UE may receive DCI 612 that schedules an intra-slot DL data transmission 614. Under this example, the UE may apply the active BWP's minimum scheduling offset (BWP1) of 0 slots, which facilitates intra-slot scheduling.

In cases where the minimum scheduling offset is defined according to the numerology of the target BWP, the minimum scheduling offset provides a consistent k0 or k2 determination for cross-BWP scheduling that takes into account numerology changes as previously discussed herein. For cross-BWP scheduling, the k0/k2 scheduling offset parameter may be interpreted based on the TDRA table of the target BWP. In case the current and target BWP have different numerologies, the target BWP's minimum scheduling offset and the indicated k0/k2 may be based on the same numerology (target BWP's). Because a UE can receive a cross-BWP grant at any slot and a-priori does not know which BWP would be the target, the minimum scheduling offsets for all possible target BWP may be taken into account, and very likely the PDCCH processing time budget would be driven by the smallest minimum scheduling offsets across all BWPs (i.e., current and possible target). Such a framework may not be preferable for making a minimum scheduling offset BWP-specific.

In certain aspects, where the target BWP provides the minimum scheduling offset, the current BWP's minimum scheduling offset may be added to a BWP switch delay as the overall required delay for cross-BWP switching. For example, FIG. 7 illustrates an example table of various BWP switch delay values (e.g., in terms of slots) associated different with numerologies (O. In certain aspects, the indicated k0 or k2 in a cross-BWP grant (in target BWP's numerology) may be expected to satisfy the overall determined delay (sum of current BWP and BWP switch delay), and also may be expected to satisfy the minimum scheduling offset of the target BWP.

The BWP switch delay may consider various assumptions, for example, related to k0=0 and k2=0 scheduling (i.e., intra-slot scheduling). For instance, the BWP switch delay may include the time for PDCCH processing, RF switch delay, and other software control delays. With a non-zero minimum k0 and k2, the PDCCH processing timeline may be relaxed. If BWP switch delay is not updated accordingly, a relaxed PDCCH processing time may overlap with other time budgets, such as for RF switching. For cross-BWP scheduling (e.g., triggering a BWP switch), the indicated k0 or k2 may be large enough to accommodate a sum of a minimum scheduling offset associated with the target BWP (converted to the target BWP's numerology if different) and the BWP switch delay. An adjustment term (e.g. plus or minus 1 slot) may be added to the sum. Alternatively, the added offset may be specifically configured and different from the minimum scheduling offset of the BWP.

In certain aspects, for a DCI-based BWP switch, after the UE receives BWP switching request at slot n on a serving cell, UE may receive PDSCH (for DL active BWP switch) or transmit PUSCH (for UL active BWP switch) on the new BWP on the serving cell on which BWP switch occurs no later than at slot $n+T_{BWPswitchDelay}$. If any one of the minimum applicable values for k0 and k2 (e.g., the minimum scheduling offsets corresponding to k0 and k2) for the currently active DL and UL BWP is greater than zero, the smaller of the two may be a time quantity added to $T_{BWPswitchDelay}$ (i.e. the delay required by UE for an active BWP change is increased). A UE may not expect to detect a DCI format 1_1 or a DCI format 0_1 indicating respectively an active DL BWP or an active UL BWP change with the corresponding time domain resource assignment field providing a slot offset value for a PDSCH reception or PUSCH transmission that is smaller than a delay required by the UE for an active DL BWP change or UL BWP change and added with the corresponding minimum scheduling offset.

Figure 8A:
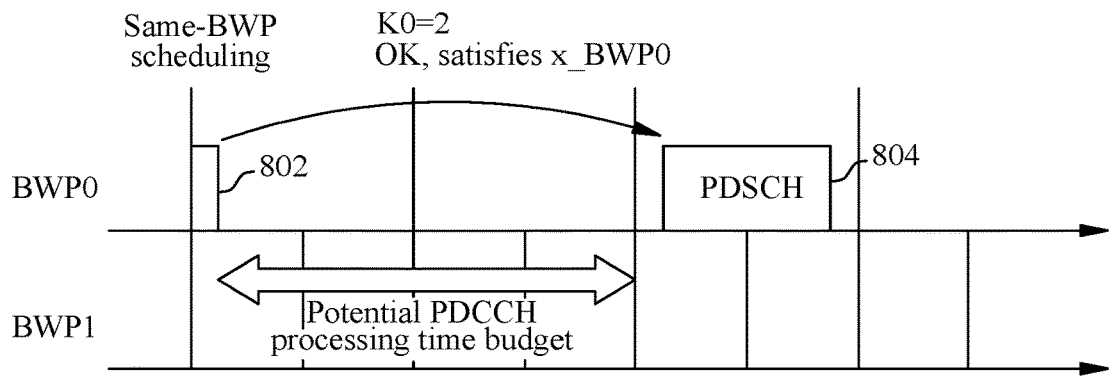
FIG. 8A illustrates example intra-BWP scheduling of downlink communications where a target BWP may provide the minimum scheduling offset, in accordance with certain aspects.

FIG. 8A illustrates example intra-BWP scheduling of downlink communications where the target BWP may provide the minimum scheduling offset, in accordance with certain aspects. Suppose the BWP switch delay is configured as 1 slot at 15 kHz SCS and 2 slots at 30 kHz SCS, the minimum scheduling offset (X) associated with BWP0 (15 kHz SCS) is set as 2 slots, the minimum scheduling offset (X) associated with BWP1 (30 kHz SCS) is set as 0 slots, and BWP0 and BWP1 may each have various values of k0 configured. As shown, a UE may receive DCI 802 from a BS via a control channel such as a PDCCH. The DCI 802 may be received in $slot_n$ and indicate a scheduling offset (e.g., k0=2) that schedules a cross-slot DL data transmission 804 in $sloth_{n+2}$. If the minimum scheduling offset associated with the target BWP (BWP0) is applied, the scheduling offset of k0=2 satisfies the minimum scheduling offset value of 2 slots.

Figure 8B:
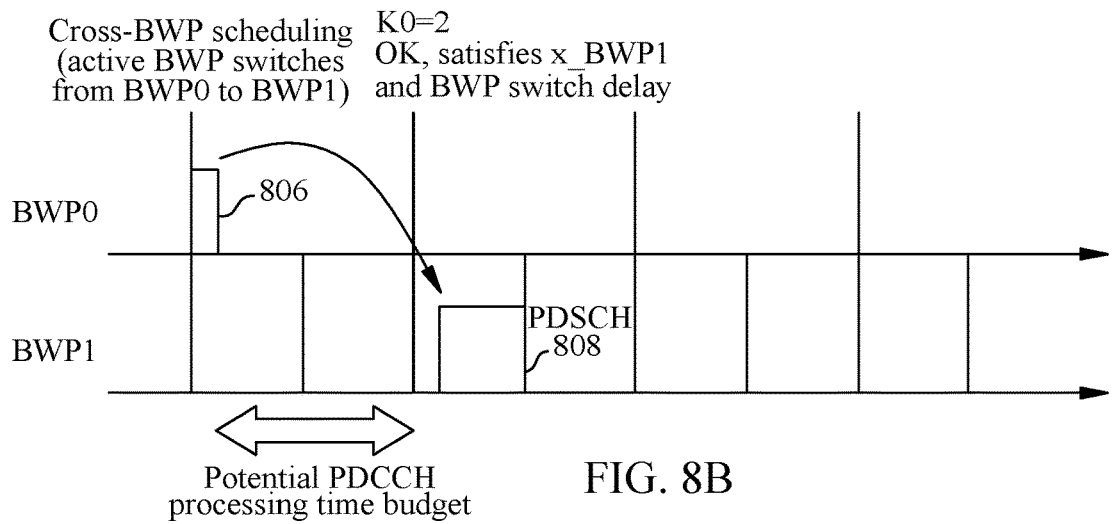
FIG. 8B illustrates example cross-BWP scheduling of downlink communications where the target BWP may provide the minimum scheduling offset, in accordance with certain aspects.

FIG. 8B illustrates example cross-BWP scheduling of downlink communications where the target BWP may provide the minimum scheduling offset, in accordance with certain aspects. As shown, the UE may receive DCI 806 from a BS via a control channel such as a PDCCH. The DCI 806 may be received in $slot_n$ and indicate a BWP identifier associated with BWP1 and a scheduling offset (e.g., k0=2 in terms of BWP1) that schedules a cross-slot DL data transmission 608 in $slot_{n+2}$ of BWP1. Assuming the same scheduling parameters (BWP switch delay, k0, and X) described herein with respect to FIG. 8A apply under this example, and if the minimum scheduling offset associated with the target BWP (BWP0) is applied, the scheduling offset of k0=2 satisfies the minimum scheduling offset value (X) of 0 slots and the BWP switch delay of 2 slots. The potential PDCCH processing time budget is smaller compared to the intra-BWP scheduling case depicted in FIG. 8A. Because the UE does not know when it is scheduled with an intra-BWP grant or a cross-BWP grant, the UE has to take the worst case (i.e. smallest) PDCCH processing time budget. In this case, the larger minimum scheduling offset configured for BWP0 may not be able to fully relax the PDCCH processing timeline considering the case for cross-BWP grant processing depicted in FIG. 8B.

Figure 8C:
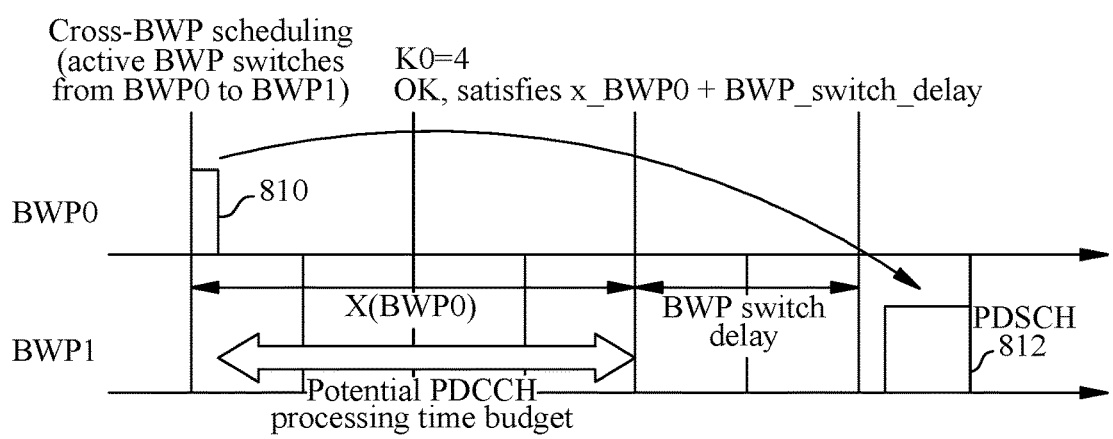
FIG. 8C illustrates another example intra-BWP scheduling of downlink communications where the minimum scheduling offset is based on the BWP switch delay, in accordance with certain aspects.

FIG. 8C illustrates another example intra-BWP scheduling of downlink communications where the minimum scheduling offset is based on the BWP switch delay, in accordance with certain aspects. As shown, the UE may receive DCI 810 from a BS via a control channel such as a PDCCH. The DCI 810 may be received in $slot_n$ and indicate a BWP identifier associated with BWP1 and a scheduling offset (e.g., k0=6 in terms of BWP1) that schedules a cross-slot DL data transmission 608 in $slot_{n+6}$ of BWP1. Assuming the same scheduling parameters (BWP switch delay, k0, and X) described herein with respect to FIG. 8A apply under this example, if the minimum scheduling offset is based on the BWP switch delay, the scheduling offset of k0=6 satisfies the sum of the minimum scheduling offset value (X) associated with the active BWP (BWP0) of 2 slots (in terms of BWP0) and the BWP switch delay of 2 slots (in terms of BWP1). This scheme resolves the issue associated with the scheme depicted in FIG. 8B in a way that the large minimum scheduling offset configured for BWP0 can be used to fully relax the PDCCH processing time budget, because it is taken into account also for cross-BWP scheduling.

In aspects, the minimum scheduling offset may be defined according to a maximum of a minimum value associated with the active BWP and a minimum value associated with the target BWP. For instance, if the active BWP's minimum offset is 2 slots and the target BWP's minimum offset is 1 slot, the cross-BWP scheduling may have a scheduling offset k0/k2 of at least max(2,1), which in this example is 2 slots. If the BWPs have different numerologies, the current BWP's offset may be converted to the target BWP's numerology before performing the max operation, for example, according to Equation (1).

In certain aspects, the minimum scheduling offset may be defined according to a sum of parameters including a minimum value associated with the active BWP and a minimum value associated with the target BWP. For example, if the active BWP's minimum offset is set as 2 slots, and the target BWP's minimum offset is set as 1 slot, the cross-BWP scheduling may have a scheduling offset k0/k2 of 3 slots. An adjustment term (e.g. plus or minus 1 slot) may be added to the sum. In some cases, the overall delay may be too large, resulting in an increased latency. If the BWPs have different numerologies, the current BWP's offset may be converted to the target BWP's numerology before performing the max operation, for example, according to Equation (1).

In certain aspects, the minimum scheduling offset may be defined for cross-BWP scheduling independently from other scheduling events. Because a UE may receive a cross-BWP grant at any slot, this effectively means that at any slot two minimum scheduling offsets may be considered. For example, the minimum scheduling offset for cross-BWP scheduling may be the minimum of the minimum value associated with the active BWP and the minimum value corresponding to the cross-BWP scheduling.

While the examples provided herein are described with respect to DL/UL scheduling grants with respect to k0/k2 to facilitate understanding, aspects of the present disclosure may also be applied to cross-BWP scheduling, cross-carrier scheduling, or other downlink control signaling event triggers (such as A-CSI-RS monitoring and reporting).

In certain aspects, the minimum scheduling offset may be set according to cross-carrier scheduling. Explicit configuration/signaling of the minimum scheduling offsets may be a unified mechanism that works for both self-carrier scheduling and cross-carrier scheduling with same or different numerologies. For example, the minimum scheduling offset may defined based on the configuration and numerology of the target BWP of the target CC according to the various BWP-based mechanisms described herein. In other aspects, the minimum scheduling offset may defined based on the configuration and numerology of the active BWP of the scheduling CC (i.e., the CC on which scheduling is received). In such a case, the minimum scheduling offset of the active BWP of the scheduling CC may be converted to the numerology of the PDSCH/PUSCH on the scheduled CC, for example, according to the following expression:

$$X' = \left\lceil X \cdot \frac{2^{\mu_{P\{D|U\}SCH}}}{2^{\mu_{PDCCH}}} \right\rceil \quad (3)$$

In aspects, the DL/UL grant parameters (k0, k2) may be checked according to the following expression:

$$\{k0 | k2\} \leq \left\lceil X \cdot \frac{2^{\mu_{P\{D|U\}SCH}}}{2^{\mu_{PDCCH}}} \right\rceil \quad (4)$$

As previously discussed, if the DL/UL grant parameters (k0, k2) are less than or equal to the converted minimum scheduling offset (X'), the DL/UL grant parameters (k0, k2) may be treated as invalid parameters. In other words, the UE may not expect the DL/UL grant parameters (k0, k2) to be less than or equal to the converted minimum scheduling offset. If the DL/UL grant parameters (k0, k2) are greater than (or equal to) the converted minimum scheduling offset, the DL/UL grant parameters (k0, k2) may be treated valid parameters.

In certain wireless communication systems (e.g., 5G NR), the UE may be determine when to apply an updated value of the minimum scheduling offset as described herein. For example, for an active DL and active UL BWP, when a UE is indicated by L1-based signaling(s) in slot n to change the minimum scheduling offset value of k0 and/or k2, the UE may not be expected to apply the new minimum scheduling offset value before slot values given by the following expressions:

$$k0: \left\lceil (n+X) \cdot \frac{2^{\mu_{PDSCH}}}{2^{\mu_{PDCCH}}} \right\rceil \quad (5)$$

$$k2: \left\lceil (n+X) \cdot \frac{2^{\mu_{PUSCH}}}{2^{\mu_{PDCCH}}} \right\rceil \quad (6)$$

where X=max (Y, Z), Y is the minimum scheduling offset value of k0 prior to the indicated change, Z is the smallest feasible non-zero application delay (e.g. 1). In another example, X=Y+Z is another way to ensure that X is at least as large as the smallest feasible non-zero application delay. In certain cases, such a mechanism to determine when the new minimum scheduling offset is applied may not be suitable for certain scheduling situations or may result in inefficiencies such as increased latency or inefficient power consumption.

Certain aspects of the present disclosure provide an enhancement to improve the framework to update the minimum scheduling offset according to an application delay. Generally speaking, the effective start time of the updated minimum value may not be earlier than the current minimum value. In certain aspects, Y with respect to Equations (5) and (6) may be the minimum value from the minimum scheduling offset value of k0 and minimum scheduling offset value of k2. In other aspects, the application delay may be determined based on an absolute time value, a number of time-domain resources (e.g., slots), or a BWP switch delay value.

Figure 9:
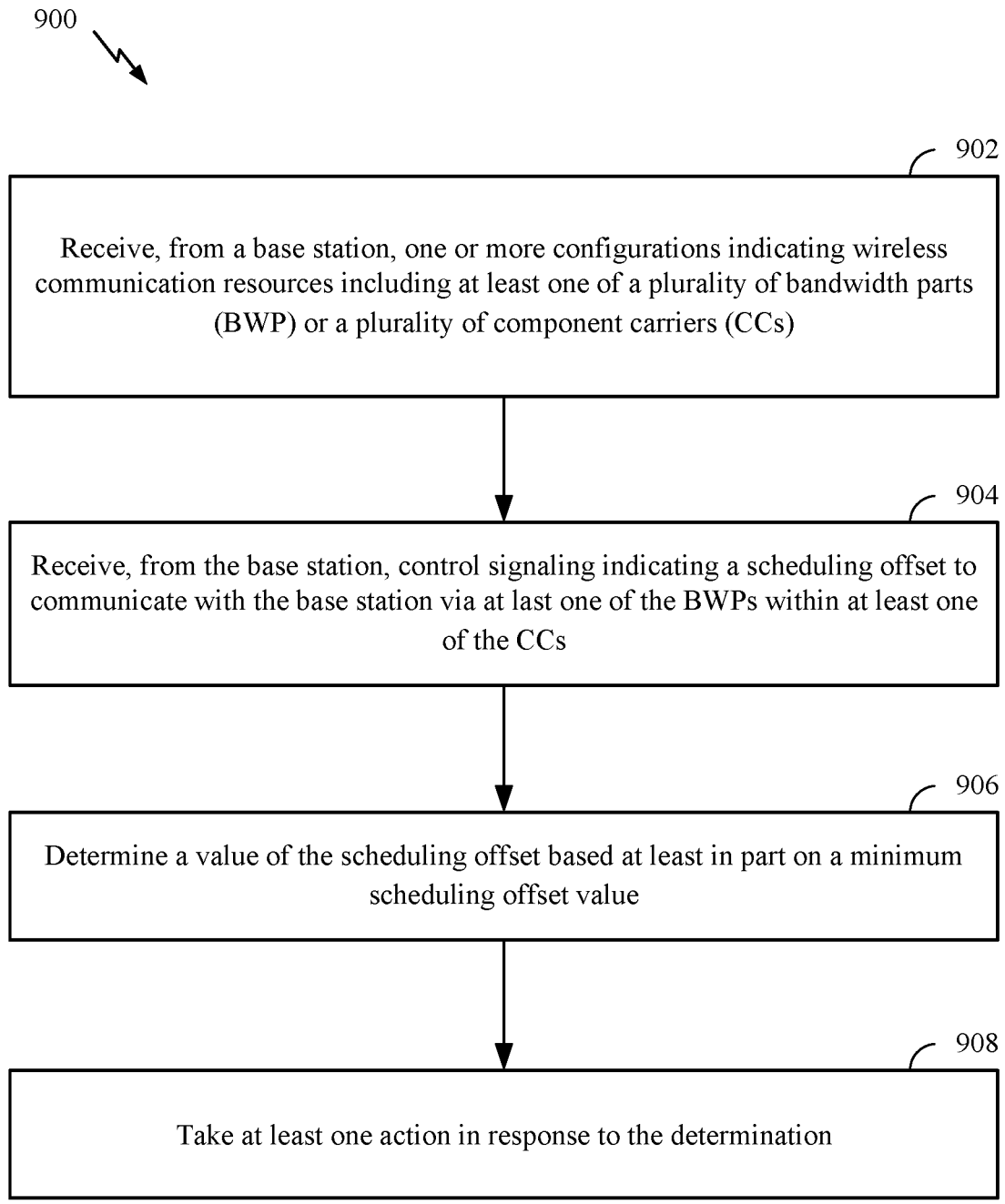
FIG. 9 is a flow diagram illustrating example operations for wireless communication by a UE, in accordance with certain aspects of the present disclosure.

FIG. 9 is a flow diagram illustrating example operations 900 for wireless communication, in accordance with certain aspects of the present disclosure. The operations 900 may be performed, for example, by UE (e.g., the UE 120a in the wireless communication network 100). Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at 902, where the UE may receive, from a base station, one or more configurations indicating wireless communication resources including at least one of a plurality of bandwidth parts (BWP) or a plurality of component carriers (CCs). At 904, the UE may receive, from the base station, control signaling indicating a scheduling offset to communicate with the base station via at last one of the BWPs within at least one of the CCs. At 906, the UE may determine a value of the scheduling offset based at least in part on a minimum scheduling offset value. At 908, the UE may take at least one action in response to the determination.

At 904, the scheduling offset may provide a scheduling delay (e.g., a specific duration in terms of time-domain resources) between an end of a reference point (e.g., a PDCCH transmission) and a beginning of a transmission or event scheduled by the PDCCH. For example, the scheduling offset may indicate a value for k0 and/or k2 for DL/UL resource grants. In other cases, the scheduling offset may provide a delay from a reference point (e.g., a PDCCH transmission) and the beginning of an event such as cross-BWP scheduling, cross-carrier scheduling, or other downlink control signaling event triggers (such as A-CSI-RS monitoring and reporting).

The minimum scheduling offset value may be determined based on various reference units, such as a numerology of a SCS, a time-domain resource, a reference parameter, or a unit of time. For instance, the minimum scheduling offset value may be given in terms of a time-domain resource (e.g., slots) and converted to an absolute value of time based on a certain reference system. In aspects, the minimum scheduling offset value may be determined based on a numerology of an active BWP among the plurality of BWPs. In other aspects, the minimum scheduling offset value may be determined based on a reference numerology, such as a designated SCS. In some cases, the UE may be configured with a set of minimum scheduling offset values, and each value may correspond to a different BWP. For instance, the minimum scheduling offset value may be selected among the plurality of minimum values, each of the minimum values corresponds to one of the plurality of BWPs. As an example, the minimum scheduling offset value among the plurality of minimum values may be selected from values associated with a specific BWP (e.g., the active BWP or target BWP) via an indication (e.g., a bitmap or bit flag) received in downlink control signaling such as DCI. That is, the indication carried via downlink control signaling may map to the minimum values configured for the specific BWP, and the UE may select the minimum scheduling offset based on the indication. Each value may be set in terms of the numerology of the corresponding BWP.

In other aspects, the minimum scheduling offset value may have the same units as the scheduling offset parameter k0 and/or k2. That is, the minimum scheduling offset value may be determined to have a same numerology as the scheduling offset (e.g., k0 and/or k2). The minimum scheduling offset value may be set to an absolute time value (e.g., 1 ms). That is, the units of the minimum scheduling offset value may be represented by a unit of time, such as milliseconds or microseconds.

In certain aspects, the minimum scheduling offset may be configured per CC. That is, the same minimum scheduling offset may be applied across BWPs within a CC. As an example, the control signaling at 904 may indicate to communicate with the base station via a target BWP that is different from an active BWP.

Alternatively or additionally, the minimum scheduling offset may be configured per BWP. As an example, the control signaling at 904 may indicate to communicate with the base station via a target BWP that is different from an active BWP. The minimum scheduling offset may be configured per BWP under various schemes. In aspects, some of the BWPs may be configured with one or more separate minimum scheduling offsets (e.g., via RRC signaling), and the value of the minimum scheduling offsets may be determined or interpreted in terms of the numerology of a specific BWP, such as the active BWP or target BWP. For instance, the minimum scheduling offset value may be set according to a minimum value (e.g., a minimum applicable value) associated with the active BWP, for example, as described herein with respect to FIG. 6B. That is, one of the minimum values configured for the active BWP may serve as the minimum scheduling offset value used for various scheduling. For example, the UE may receive downlink control signaling selecting one of the minimum values associated with the active BWP, and the selected minimum value may represent the minimum scheduling offset used for various scheduling, for example, in a BWP switch procedure that switches from the active BWP to a target BWP (e.g., a newly active BWP indicated in a BWP switch). In cases where the numerology of the active BWP is different from the numerology of the target BWP, the numerology of the minimum value associated with the active BWP may be converted to the numerology of the minimum value associated with the target BWP, for example, according to Equation (1). As an example, the operations 900 may further include the UE converting the minimum value associated with the active BWP to a numerology of the target BWP, and the minimum scheduling offset value may be set according to the converted minimum value.

In other cases, the minimum scheduling offset value may be set according to a minimum value associated with the target BWP. In cases where the minimum value associated with the target BWP may provide an insufficient delay, the minimum scheduling offset value may set according to a sum of parameters including a minimum value associated with the active BWP and a BWP switch delay value, for example, as described herein with respect to FIGS. 7 and 8C. In certain aspects, the sum of parameters may also include an adjustment term (e.g., a signed value of slots). That is, the minimum scheduling offset value may be equal to the sum of the minimum value associated with the active BWP, the BWP switch delay value, and the adjustment term.

In aspects, the minimum scheduling offset value may be set according to a maximum of a first minimum value associated with the target BWP and a second minimum value associated with the active BWP. In cases where the numerology of the active BWP is different from the numerology of the target BWP, the numerology of the minimum value associated with the active BWP may be converted to the numerology of the minimum value associated with the target BWP, for example, according to Equation (1). For example, operations 900 may further include the UE converting the second minimum value associated with the active BWP to a numerology of the target BWP, and the minimum scheduling offset value may be set according to the maximum of a first minimum value associated with the target BWP and the converted second minimum value.

In certain aspects, the minimum scheduling offset value may be set according to a sum of parameters including a first minimum value associated with the target BWP and a second minimum value associated with the active BWP. In certain aspects, the sum of parameters may also include an adjustment term (e.g., a signed value of slots). That is, the minimum scheduling offset value may be equal to the sum of the minimum value associated with the target BWP, the minimum value associated with the active BWP, and the adjustment term. In cases where the numerology of the active BWP is different from the numerology of the target BWP, the numerology of the minimum value associated with the active BWP may be converted to the numerology of the minimum value associated with the target BWP, for example, according to Equation (1). For example, operations 900 may further include the UE converting the second minimum value associated with the active BWP to a numerology of the target BWP, and the minimum scheduling offset value may be set according to the sum of parameters including the first minimum value associated with the target BWP and the converted second minimum value, and optionally the adjustment term.

In other aspects, the minimum scheduling offset value may be configured per cross-BWP scheduling. That is, the minimum scheduling offset may be defined for cross-BWP scheduling events independently. The minimum scheduling offset for cross-BWP scheduling may be the minimum of the minimum value associated with the active BWP and the minimum value corresponding to the cross-BWP scheduling. For example, the minimum scheduling offset value may be set according to a minimum of a first minimum value associated with cross-BWP scheduling and a second minimum value associated with the active BWP.

In certain cases, the UE may receive an updated value for the minimum scheduling offset. In such cases, the UE may determine when to apply the updated value. For example, the operations 900 may further include the UE receiving, from the base station, additional control signaling indicating an updated minimum scheduling offset value. The UE may determine an application delay to apply the updated minimum scheduling offset value based on at least one of an absolute time value, a number of time-domain resources (e.g., slots), or a BWP switch delay value, for example, as described herein with respect to FIG. 7. The UE may apply the updated minimum scheduling offset value based on the application delay. That is, the UE may apply the updated minimum scheduling at the time indicated by the application delay. The application delay may be the delay between the control signaling that carries the updated value for the minimum scheduling offset and the time to apply the updated value.

In certain aspects, the minimum scheduling offset may be configured for cross-carrier scheduling. In some cases, the minimum scheduling offset may defined based on the configuration and numerology of the target BWP of the target CC according to the various BWP-based mechanisms described herein. As an example, the control signaling at 904 may be received on a first component carrier and indicate to communicate via a second component carrier, and the minimum scheduling offset value may be configured according to a numerology of an active BWP of the second component carrier. That is, the active BWP of the scheduled CC (i.e., the target CC) may provide the minimum scheduling offset and the numerology in which the minimum scheduling offset is interpreted. Expressed another way, the minimum scheduling offset assigned to the active BWP of the scheduled CC may represent the minimum scheduling offset used for various scheduling, such as cross-carrier scheduling. In other cases, the minimum scheduling offset value may be set according to the max of the active BWP and the target BWP, the sum of the active BWP and the target BWP, or a particular minimum scheduling offset for cross-carrier scheduling.

In other aspects, the minimum scheduling offset may defined based on the configuration and numerology of the active BWP of the scheduling CC (i.e., the CC on which scheduling is received). For example, the control signaling at 904 may be received on a first component carrier and indicate to communicate via a second component carrier, and the minimum scheduling offset value may be configured according to a numerology of an active BWP of the first component carrier. In cases where the numerology of the active BWP is different from the numerology of the target BWP, the numerology of the minimum value associated with the active BWP may be converted to the numerology of the minimum value associated with the target BWP, for example, according to Equation (3). For example, the operations 900 may further include the UE converting a minimum value associated with the active BWP of the first component carrier to a numerology of a target BWP of the second component carrier, and the minimum scheduling offset value may be set according to the converted minimum value.

In cases where the scheduling offset is at or below (e.g., less than or equal to) the minimum scheduling offset value, the UE may take various actions. For example, the UE may treat the control signaling as invalid and ignore control signaling if the value of the scheduling offset is below the minimum scheduling offset value. In certain cases, the UE may treat the scheduling offset as having a value of the minimum scheduling offset value in cases where the scheduling offset is below the minimum scheduling offset value. In other cases, the UE may communicate with the base station at the time indicated by the scheduling offset if the value of the scheduling offset is at or above the minimum scheduling offset value. For example, the scheduling offset may be an uplink grant enabling the UE to transmit data to the base station. As another example, the scheduling offset may be a downlink grant enabling the UE to receive data from the base station.

Figure 10:
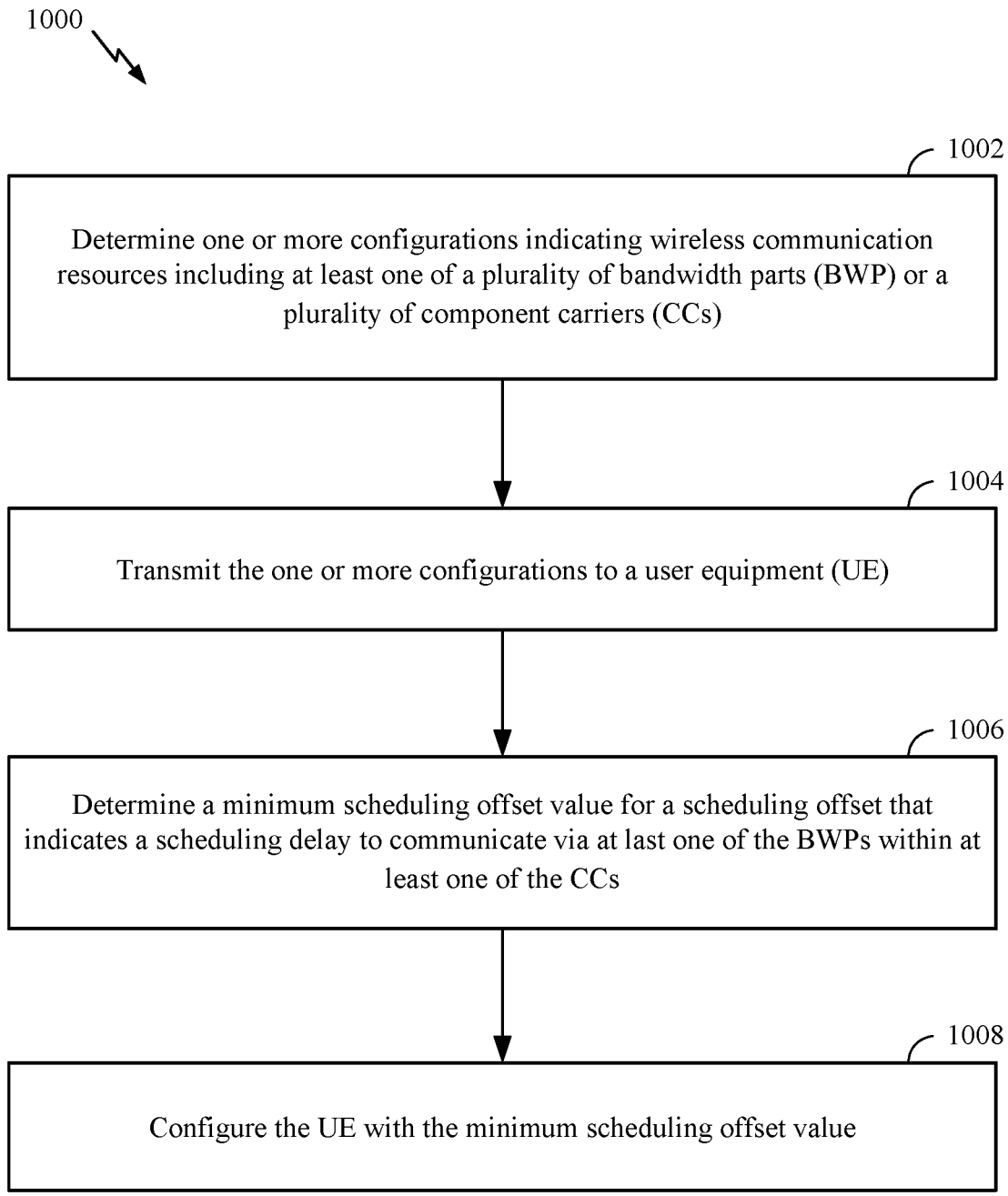
FIG. 10 is a flow diagram illustrating example operations for wireless communication by a BS, in accordance with certain aspects of the present disclosure.

FIG. 10 is a flow diagram illustrating example operations 1000 for wireless communication, in accordance with certain aspects of the present disclosure. The operations 1000 may be performed, for example, by a BS (e.g., the BS 110a in the wireless communication network 100). The operations 1000 may be complimentary to the operations 900 performed by the UE. Operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at 1002, where the BS may determine one or more configurations indicating wireless communication resources including at least one of a plurality of bandwidth parts (BWP) or a plurality of component carriers (CCs). At 1004, the BS may transmit the one or more configurations to a user equipment (UE). At 1006, the BS may determine a minimum scheduling offset value for a scheduling offset that indicates a scheduling delay to communicate via at last one of the BWPs within at least one of the CCs. At 1008, the BS may configure the UE with the minimum scheduling offset value.

The base station may use the minimum scheduling offset value in determining a scheduling offset value for DL/UL scheduling grants (k0/k2), cross-BWP scheduling, cross-carrier scheduling, or other downlink control signaling event triggers (such as A-CSI-RS monitoring and reporting). For instance, the base station may determine a value for k0/k2 that satisfies a threshold associated with the minimum scheduling offset value (e.g., k0≥ the minimum scheduling offset value) when scheduling DL/UL resource grants.

At 1008, the BS may configure the UE with the minimum scheduling offset value, for example, by transmitting, to the UE, a configuration indicating one or more minimum scheduling offset values. For example, the BS may configure the UE with various values of the minimum scheduling offset via downlink control signaling, including DCI, a MAC-CE, or RRC configuration.

The minimum scheduling offset value may be determined based on various reference units, such as a numerology of a SCS, a time-domain resource, a reference parameter, or a unit of time. For instance, the minimum scheduling offset value may be given in terms of a time-domain resource (e.g., slots) and converted to an absolute value of time based on a certain reference system. In aspects, the minimum scheduling offset value may be determined based on a numerology of an active BWP among the plurality of BWPs. In other aspects, the minimum scheduling offset value may be determined based on a reference numerology, such as a designated SCS. In some cases, the UE may be configured with a set of minimum scheduling offset values, and each value may correspond to a different BWP. For instance, the minimum scheduling offset value may be selected among the plurality of minimum values, each of the minimum values corresponds to one of the plurality of BWPs. Each value may be set in terms of the numerology of the corresponding BWP.

In other aspects, the minimum scheduling offset value may have the same units as the scheduling offset parameter k0 and/or k2. That is, the minimum scheduling offset value may be determined to have a same numerology as the scheduling offset (e.g., k0 and/or k2). The minimum scheduling offset value may be set to an absolute time value (e.g., 1 ms). That is, the units of the minimum scheduling offset value may be represented by a unit of time, such as millisecond or microseconds.

In certain aspects, the minimum scheduling offset may be configured per CC. That is, the same minimum scheduling offset may be applied across all of the BWPs within a CC. As an example, the base station may transmit, to the UE, control signaling that indicates to communicate with the base station via a target BWP that is different from an active BWP, and the minimum scheduling offset value may be configured per component carrier.

Alternatively or additionally, the minimum scheduling offset may be configured per BWP. As an example, the base station may transmit, to the UE, control signaling that indicates to communicate with the base station via a target BWP that is different from an active BWP, and the minimum scheduling offset value may be configured per BWP under various schemes. For instance, the minimum scheduling offset value may set according to a minimum value associated with the active BWP, for example, as described herein. In cases where the numerology of the active BWP is different from the numerology of the target BWP, the numerology of the minimum value associated with the active BWP may be converted to the numerology of the minimum value associated with the target BWP, for example, according to Equation (1). As an example, the operations 1000 may further include the base station converting the minimum value associated with the active BWP to a numerology of the target BWP, and the minimum scheduling offset value may be set according to the converted minimum value to determine scheduling offsets.

In other cases, the minimum scheduling offset value may be set according to a minimum value associated with the target BWP. In cases where the minimum value associated with the target BWP may provide an insufficient delay, the minimum scheduling offset value may be set according to a sum of parameters including a minimum value associated with the active BWP and a BWP switch delay value, for example, as described herein with respect to FIGS. 7 and 8C. In certain aspects, the sum of parameters may also include an adjustment term (e.g., a signed value of slots). That is, the minimum scheduling offset value may be equal to the sum of the minimum value associated with the active BWP, the BWP switch delay value, and the adjustment term.

In aspects, the minimum scheduling offset value may be set according to a maximum of a first minimum value associated with the target BWP and a second minimum value associated with the active BWP. In cases where the numerology of the active BWP is different from the numerology of the target BWP, the numerology of the minimum value associated with the active BWP may be converted to the numerology of the minimum value associated with the target BWP, for example, according to Equation (1). For example, operations 1000 may further include the base station converting the second minimum value associated with the active BWP to a numerology of the target BWP, and the minimum scheduling offset value may be set according to the maximum of a first minimum value associated with the target BWP and the converted second minimum value.

In certain aspects, the minimum scheduling offset value may be set according to a sum of parameters including a first minimum value associated with the target BWP and a second minimum value associated with the active BWP. In certain aspects, the sum of parameters may also include an adjustment term (e.g., a signed value of slots). That is, the minimum scheduling offset value may be equal to the sum of the minimum value associated with the target BWP, the minimum value associated with the active BWP, and the adjustment term. In cases where the numerology of the active BWP is different from the numerology of the target BWP, the numerology of the minimum value associated with the active BWP may be converted to the numerology of the minimum value associated with the target BWP, for example, according to Equation (1). For example, operations 1000 may further include the base station converting the second minimum value associated with the active BWP to a numerology of the target BWP, and the minimum scheduling offset value may be set according to the sum of parameters including the first minimum value associated with the target BWP and the converted second minimum value, and optionally the adjustment term.

In other aspects, the minimum scheduling offset value may be configured per cross-BWP scheduling. That is, the minimum scheduling offset may be defined for cross-BWP scheduling events independently. The minimum scheduling offset for cross-BWP scheduling may be the minimum of the minimum value associated with the active BWP and the minimum value corresponding to the cross-BWP scheduling. For example, the minimum scheduling offset value may be set according to a minimum of a first minimum value associated with cross-BWP scheduling and a second minimum value associated with the active BWP.

In certain cases, the base station may configure the UE with an updated value for the minimum scheduling offset. For example, operations 1000 may further include the base station determining an updated minimum scheduling offset value and transmitting, to the UE, control signaling indicating an updated minimum scheduling offset value. The base station may determine an application delay to apply the updated minimum scheduling offset value based on at least one of an absolute time value, a number of time-domain resources, or a BWP switch delay value. The base station may apply the updated minimum scheduling offset value based on the application delay. That is, the base station may apply the updated minimum scheduling at the time indicated by the application delay.

In certain aspects, the minimum scheduling offset may be configured for cross-carrier scheduling. In some cases, the minimum scheduling offset may defined based on the configuration and numerology of the target BWP of the target CC according to the various BWP-based mechanisms described herein. For example, the base station may transmit on a first component carrier, to the UE, control signaling that indicates to communicate via a second component carrier, and the minimum scheduling offset value and configured according to a numerology of an active BWP of the second component carrier.

In other aspects, the minimum scheduling offset may defined based on the configuration and numerology of the active BWP of the scheduling CC (i.e., the CC on which scheduling is received). For example, the base station may transmit on a first component carrier, to the UE, control signaling that indicates to communicate via a second component carrier, and the minimum scheduling offset value may be configured according to a numerology of an active BWP of the first component carrier. In cases where the numerology of the active BWP is different from the numerology of the target BWP, the numerology of the minimum value associated with the active BWP may be converted to the numerology of the minimum value associated with the target BWP, for example, according to Equation (3). For example, the operations 1000 may further include the base station converting a minimum value associated with the active BWP of the first component carrier to a numerology of a target BWP of the second component carrier, and the minimum scheduling offset value may be set according to the converted minimum value.

Figure 11:
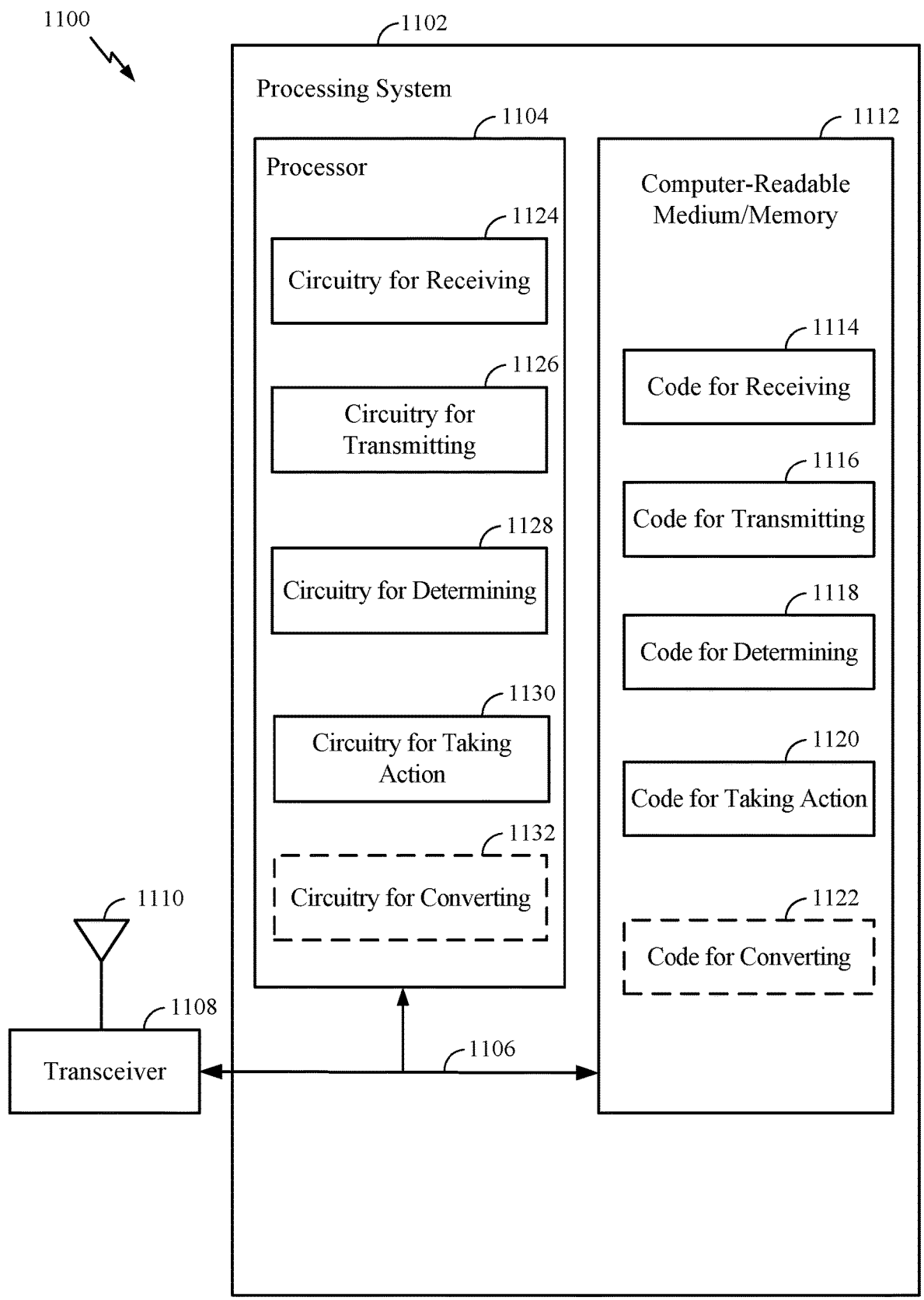
FIG. 11 illustrates a communications device (e.g., a UE) that may include various components configured to perform operations for the techniques disclosed herein in accordance with aspects of the present disclosure.

FIG. 11 illustrates a communications device 1100 (e.g., the UE 120a) that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein related to the minimum scheduling offset. In certain aspects, computer-readable medium/memory 1112 stores code for receiving 1114, code for transmitting 1116, code for determining 1118, code for taking action 1120, and/or code for converting 1122. In certain aspects, the processor 1104 has circuitry configured to implement the code stored in the computer-readable medium/memory 1112. The processor 1104 includes circuitry for receiving 1124, circuitry for transmitting 1126, circuitry for determining 1128, circuitry for taking action 1130, and/or circuitry for converting 1122.

Figure 12:
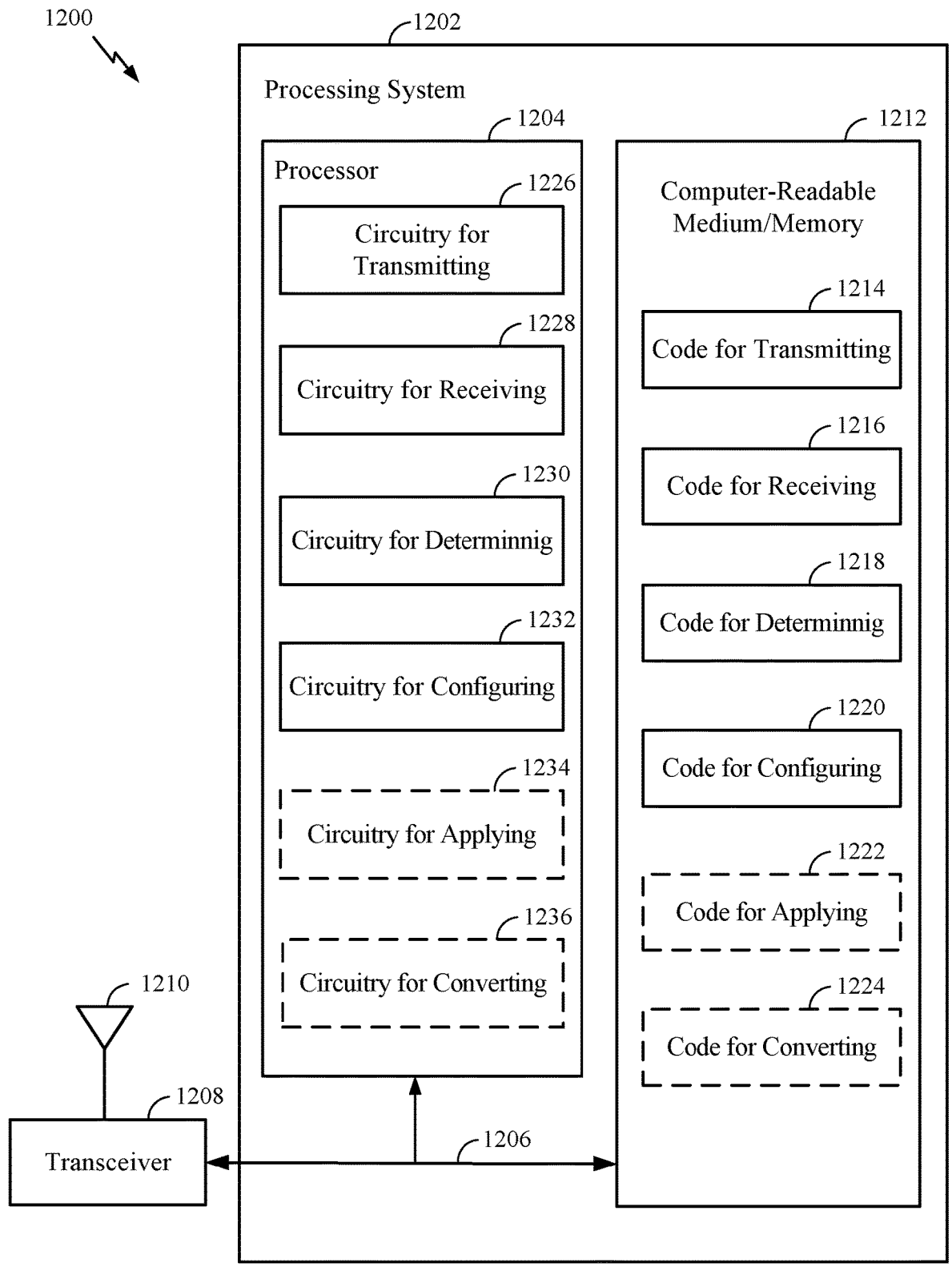
FIG. 12 illustrates a communications device (e.g., a BS) that may include various components configured to perform operations for the techniques disclosed herein in accordance with aspects of the present disclosure.

FIG. 12 illustrates a communications device 1200 (e.g., the BS 110a) that may include various components (e.g., corresponding to means-plus-function components) configured to perform operations for the techniques disclosed herein, such as the operations illustrated in FIG. 10. The communications device 1200 includes a processing system 1202 coupled to a transceiver 1208 (e.g., a transmitter and/or receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein related to the minimum scheduling offset. In certain aspects, computer-readable medium/memory 1212 stores code for transmitting 1214, code for receiving 1216, code for determining 1218, code for configuring 1220, code for applying 1222, and/or code for converting 1224. In certain aspects, the processor 1204 has circuitry configured to implement the code stored in the computer-readable medium/memory 1212. The processor 1204 includes circuitry for transmitting 1226, circuitry for receiving 1228, circuitry for determining 1230, circuitry for configuring 1232, circuitry for applying 1234, and/or circuitry for converting.

Example Aspects

Implementation examples are described in the following numbered clauses:

Aspect 1: A method of wireless communication by a user equipment, comprising: receiving, from a base station, one or more configurations indicating wireless communication resources including at least one of a plurality of bandwidth parts (BWP) or a plurality of component carriers (CCs); receiving, from the base station, control signaling indicating a scheduling offset to communicate with the base station via at last one of the BWPs within at least one of the CCs, wherein the control signaling indicates to communicate with the base station via a target BWP that is different from an active BWP; converting a minimum scheduling offset value associated with the active BWP to a numerology of the target BWP; determining a value of the scheduling offset based at least in part on the converted minimum scheduling offset value; and performing at least one action in response to the determination.

Aspect 2: The method of Aspect 1, wherein the minimum scheduling offset value is determined based on a numerology of the active BWP among the plurality of BWPs.

Aspect 3: The method of Aspect 1 or Aspect 2, wherein the minimum scheduling offset value is selected among a plurality of minimum values.

Aspect 4: The method according to any of Aspects 1-3, wherein the minimum scheduling offset value is determined to have a same numerology as the scheduling offset.

Aspect 5: The method according to any of Aspects 1-4, wherein the minimum scheduling offset value is configured per BWP.

Aspect 6: The method according to any of Aspects 1-5, wherein converting the minimum scheduling offset value comprises converting the minimum scheduling offset value based at least in part on a ratio of the numerology of the target BWP to a numerology of the active BWP.

Aspect 7: The method of Aspect 6, wherein converting the minimum scheduling offset value comprises converting the minimum scheduling offset value based at least in part on a product of the minimum scheduling offset value and the ratio.

Aspect 8: The method according to any of Aspects 1-7, further comprising: receiving, from the base station, additional control signaling indicating an updated minimum scheduling offset value; determining an application delay to apply the updated minimum scheduling offset value based on at least one of an absolute time value, a number of time-domain resources, or a BWP switch delay value; and applying the updated minimum scheduling offset value based on the application delay.

Aspect 9: The method according to any of Aspects 1-8, wherein: the control signaling is received on the active BWP of a first component carrier and indicates to communicate via a target BWP of a second component carrier; and the minimum scheduling offset value is configured according to a numerology of the active BWP of the second component carrier.

Aspect 10: The method according to any of Aspects 1-9, wherein performing the at least one action comprises communicating with the base station via the target BWP if the value of the scheduling offset is greater than or equal to the converted minimum scheduling offset value.

Aspect 11: The method according to any of Aspects 1-10, wherein performing the at least one action comprises treating the control signaling as invalid if the value of the scheduling offset is less than the minimum scheduling offset value.

Aspect 12: A method of wireless communication by a user equipment, comprising: receiving one or more configurations indicating wireless communication resources including at least one of a plurality of bandwidth parts (BWP) or a plurality of component carriers (CCs); receiving control signaling indicating a scheduling offset to communicate with a base station via at last one of the BWPs within at least one of the CCs, wherein the control signaling indicates to communicate with the base station via a target BWP that is different from an active BWP; converting a minimum scheduling offset value associated with the active BWP to a numerology of the target BWP; and communicating with the base station via the target BWP in response to determining that a value of the scheduling offset is greater or equal to the converted minimum scheduling offset value.

Aspect 13: The method of Aspect 12, wherein converting the minimum scheduling offset value comprises converting the minimum scheduling offset value based at least in part on a ratio of the numerology of the target BWP to a numerology of the active BWP.

Aspect 14: The method of Aspect 13, wherein converting the minimum scheduling offset value comprises converting the minimum scheduling offset value based at least in part on a product of the minimum scheduling offset value and the ratio.

Aspect 15: An apparatus for wireless communication, comprising: a memory; and a processor coupled to the memory, the processor and the memory being configured to: receive, from a base station, one or more configurations indicating wireless communication resources including at least one of a plurality of bandwidth parts (BWP) or a plurality of component carriers (CCs), receive, from the base station, control signaling indicating a scheduling offset to communicate with the base station via at last one of the BWPs within at least one of the CCs, wherein the control signaling indicates to communicate with the base station via a target BWP that is different from an active BWP, convert a minimum scheduling offset value associated with the active BWP to a numerology of the target BWP, determine that a value of the scheduling offset based at least in part on the converted minimum scheduling offset value, and perform at least one action in response to the determination.

Aspect 16: The apparatus of Aspect 15, wherein the minimum scheduling offset value is determined based on a numerology of the active BWP among the plurality of BWPs.

Aspect 17: The apparatus of Aspect 15 or Aspect 16, wherein the minimum scheduling offset value is selected among a plurality of minimum values.

Aspect 18: The apparatus according to any of Aspects 15-17, wherein the minimum scheduling offset value is determined to have a same numerology as the scheduling offset.

Aspect 19: The apparatus according to any of Aspects 15-18, wherein the minimum scheduling offset value is configured per BWP.

Aspect 20: The apparatus according to any of Aspects 15-19, wherein to convert the minimum scheduling offset value, the processor and the memory are further configured to convert the minimum scheduling offset value based at least in part on a ratio of the numerology of the target BWP to a numerology of the active BWP.

Aspect 21: The apparatus of Aspect 20, wherein to convert the minimum scheduling offset value, the processor and the memory are further configured to convert the minimum scheduling offset value based at least in part on a product of the minimum scheduling offset value and the ratio.

Aspect 22: The apparatus according to any of Aspects 15-21, wherein the processor and the memory are further configured to: receive, from the base station, additional control signaling indicating an updated minimum scheduling offset value, determine an application delay to apply the updated minimum scheduling offset value based on at least one of an absolute time value, a number of time-domain resources, or a BWP switch delay value, and apply the updated minimum scheduling offset value based on the application delay.

Aspect 23: The apparatus according to any of Aspects 15-22, wherein: the control signaling is received on the active BWP of a first component carrier and indicates to communicate via a target BWP of a second component carrier; and the minimum scheduling offset value is configured according to a numerology of the active BWP of the second component carrier.

Aspect 24: The apparatus according to any of Aspects 15-23, wherein to perform the at least one action, the processor and the memory are further configured to communicate with the base station via the target BWP if the value of the scheduling offset is greater than or equal to the converted minimum scheduling offset value.

Aspect 25: The apparatus according to any of Aspects 15-24, wherein to perform the at least one action, the processor and the memory are further configured to treat the control signaling as invalid if the value of the scheduling offset is below the minimum scheduling offset value.

Aspect 26: An apparatus for wireless communication, comprising: a memory; and a processor coupled to the memory, the processor and the memory being configured to: receive one or more configurations indicating wireless communication resources including at least one of a plurality of bandwidth parts (BWP) or a plurality of component carriers (CCs), receive control signaling indicating a scheduling offset to communicate with a base station via at last one of the BWPs within at least one of the CCs, wherein the control signaling indicates to communicate with the base station via a target BWP that is different from an active BWP, convert a minimum scheduling offset value associated with the active BWP to a numerology of the target BWP, and communicate with the base station via the target BWP in response to determining that a value of the scheduling offset is greater than or equal to the converted minimum scheduling offset value.

Aspect 27: The apparatus of Aspect 26, wherein to convert the minimum scheduling offset value, the processor and the memory are further configured to convert the minimum scheduling offset value based at least in part on a ratio of the numerology of the target BWP to a numerology of the active BWP.

Aspect 28: The apparatus of Aspect 27, wherein to convert the minimum scheduling offset value, the processor and the memory are further configured to convert the minimum scheduling offset value based at least in part on a product of the minimum scheduling offset value and the ratio.

Aspect 29: An apparatus, comprising: a memory comprising computer-executable instructions; one or more processors configured to execute the computer-executable instructions and cause the processing system to perform a method in accordance with any of Aspects 1-14.

Aspect 30: An apparatus, comprising means for performing a method in accordance with any of Aspects 1-14.

Aspect 31: A non-transitory computer-readable medium comprising computer-executable instructions that, when executed by one or more processors of a processing system, cause the processing system to perform a method in accordance with any of Aspects 1-14.

Aspect 32: A computer program product embodied on a computer-readable storage medium comprising code for performing a method in accordance with any of Aspects 1-14.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment, comprising:
   receiving, from a base station, one or more configurations indicating wireless communication resources including at least one of a plurality of bandwidth parts (BWP) or a plurality of component carriers (CCs);
   receiving, from the base station, control signaling indicating a scheduling offset to communicate with the base station via at last least one of the BWPs within at least one of the CCs, wherein the control signaling indicates to communicate with the base station via a target BWP that is different from an active BWP;
   converting a minimum scheduling offset value associated with the active BWP to a numerology of the target BWP;
   determining a value of the scheduling offset based at least in part on the converted minimum scheduling offset value; and
   performing at least one action in response to the determination.

2. The method of claim 1, wherein the minimum scheduling offset value is determined based on a numerology of the active BWP among the plurality of BWPs.

3. The method of claim 1, wherein the minimum scheduling offset value is selected among a plurality of minimum values.

4. The method of claim 1, wherein the minimum scheduling offset value is determined to have a same numerology as the scheduling offset.

5. The method of claim 1, wherein the minimum scheduling offset value is configured per BWP.

6. The method of claim 1, wherein converting the minimum scheduling offset value comprises converting the minimum scheduling offset value based at least in part on a ratio of the numerology of the target BWP to a numerology of the active BWP.

7. The method of claim 6, wherein converting the minimum scheduling offset value comprises converting the minimum scheduling offset value based at least in part on a product of the minimum scheduling offset value and the ratio.

8. The method of claim 1, further comprising:
   receiving, from the base station, additional control signaling indicating an updated minimum scheduling offset value;
   determining an application delay to apply the updated minimum scheduling offset value based on at least one of an absolute time value, a number of time-domain resources, or a BWP switch delay value; and
   applying the updated minimum scheduling offset value based on the application delay.

9. The method of claim 1, wherein:
   the control signaling is received on the active BWP of a first component carrier and indicates to communicate via a target BWP of a second component carrier; and
   the minimum scheduling offset value is configured according to a numerology of the active BWP of the second component carrier.

10. The method of claim 1, wherein performing the at least one action comprises communicating with the base station via the target BWP if the value of the scheduling offset is greater than or equal to the converted minimum scheduling offset value.

11. The method of claim 1, wherein performing the at least one action comprises treating the control signaling as invalid if the value of the scheduling offset is less than the minimum scheduling offset value.

12. A method of wireless communication by a user equipment, comprising:
   receiving one or more configurations indicating wireless communication resources including at least one of a plurality of bandwidth parts (BWP) or a plurality of component carriers (CCs);
   receiving control signaling indicating a scheduling offset to communicate with a base station via at least one of the BWPs within at least one of the CCs, wherein the control signaling indicates to communicate with the base station via a target BWP that is different from an active BWP;
   converting a minimum scheduling offset value associated with the active BWP to a numerology of the target BWP; and
   communicating with the base station via the target BWP in response to determining that a value of the scheduling offset is greater than or equal to the converted minimum scheduling offset value.

13. The method of claim 12, wherein converting the minimum scheduling offset value comprises converting the minimum scheduling offset value based at least in part on a ratio of the numerology of the target BWP to a numerology of the active BWP.

14. The method of claim 13, wherein converting the minimum scheduling offset value comprises converting the minimum scheduling offset value based at least in part on a product of the minimum scheduling offset value and the ratio.

15. An apparatus for wireless communication, comprising:
   a memory; and
   a processor coupled to the memory, the processor and the memory being configured to:
      receive, from a base station, one or more configurations indicating wireless communication resources including at least one of a plurality of bandwidth parts (BWP) or a plurality of component carriers (CCs),
      receive, from the base station, control signaling indicating a scheduling offset to communicate with the base station via at last least one of the BWPs within at least one of the CCs, wherein the control signaling indicates to communicate with the base station via a target BWP that is different from an active BWP,
      convert a minimum scheduling offset value associated with the active BWP to a numerology of the target BWP,
      determine that a value of the scheduling offset based at least in part on the converted minimum scheduling offset value, and perform at least one action in response to the determination.

16. The apparatus of claim 15, wherein the minimum scheduling offset value is determined based on a numerology of the active BWP among the plurality of BWPs.

17. The apparatus of claim 15, wherein the minimum scheduling offset value is selected among a plurality of minimum values.

18. The apparatus of claim 15, wherein the minimum scheduling offset value is determined to have a same numerology as the scheduling offset.

19. The apparatus of claim 15, wherein the minimum scheduling offset value is configured per BWP.

20. The apparatus of claim 15, wherein to convert the minimum scheduling offset value, the processor and the memory are further configured to convert the minimum scheduling offset value based at least in part on a ratio of the numerology of the target BWP to a numerology of the active BWP.

21. The apparatus of claim 20, wherein to convert the minimum scheduling offset value, the processor and the memory are further configured to convert the minimum scheduling offset value based at least in part on a product of the minimum scheduling offset value and the ratio.

22. The apparatus of claim 15, wherein the processor and the memory are further configured to:
receive, from the base station, additional control signaling indicating an updated minimum scheduling offset value,
determine an application delay to apply the updated minimum scheduling offset value based on at least one of an absolute time value, a number of time-domain resources, or a BWP switch delay value, and
apply the updated minimum scheduling offset value based on the application delay.

23. The apparatus of claim 15, wherein:
the control signaling is received on the active BWP of a first component carrier and indicates to communicate via a target BWP of a second component carrier; and
the minimum scheduling offset value is configured according to a numerology of the active BWP of the second component carrier.

24. The apparatus of claim 15, wherein to perform the at least one action, the processor and the memory are further configured to communicate with the base station via the target BWP if the value of the scheduling offset is greater than or equal to the converted minimum scheduling offset value.

25. The apparatus of claim 15, wherein to perform the at least one action, the processor and the memory are further configured to treat the control signaling as invalid if the value of the scheduling offset is below the minimum scheduling offset value.

26. An apparatus for wireless communication, comprising:
a memory; and
a processor coupled to the memory, the processor and the memory being configured to:
receive one or more configurations indicating wireless communication resources including at least one of a plurality of bandwidth parts (BWP) or a plurality of component carriers (CCs),
receive control signaling indicating a scheduling offset to communicate with a base station via at least one of the BWPs within at least one of the CCs, wherein the control signaling indicates to communicate with the base station via a target BWP that is different from an active BWP,
convert a minimum scheduling offset value associated with the active BWP to a numerology of the target BWP, and
communicate with the base station via the target BWP in response to determining that a value of the scheduling offset is greater than or equal to the converted minimum scheduling offset value.

27. The apparatus of claim 26, wherein to convert the minimum scheduling offset value, the processor and the memory are further configured to convert the minimum scheduling offset value based at least in part on a ratio of the numerology of the target BWP to a numerology of the active BWP.

28. The apparatus of claim 27, wherein to convert the minimum scheduling offset value, the processor and the memory are further configured to convert the minimum scheduling offset value based at least in part on a product of the minimum scheduling offset value and the ratio.

* * * * *